(12) United States Patent
Zhang et al.

(10) Patent No.: US 10,834,603 B2
(45) Date of Patent: Nov. 10, 2020

(54) RESERVATION SIGNAL FOR TRANSMISSION OPPORTUNITY DESIGN FOR SPECTRUM SHARING

(71) Applicant: QUALCOMM Incorporated, San Diego, CA (US)

(72) Inventors: Xiaoxia Zhang, San Diego, CA (US); Siddhartha Mallik, San Diego, CA (US); Taesang Yoo, San Diego, CA (US); Juan Montojo, San Diego, CA (US); Aleksandar Damnjanovic, Del Mar, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/227,121

(22) Filed: Dec. 20, 2018

(65) Prior Publication Data

US 2019/0124518 A1    Apr. 25, 2019

Related U.S. Application Data

(62) Division of application No. 15/650,047, filed on Jul. 14, 2017, now Pat. No. 10,231,132.

(Continued)

(51) Int. Cl.
*H04W 72/04* (2009.01)
*H04W 16/14* (2009.01)
(Continued)

(52) U.S. Cl.
CPC .......... *H04W 16/14* (2013.01); *H04L 5/0016* (2013.01); *H04L 5/0048* (2013.01);
(Continued)

(58) Field of Classification Search
CPC ............. H04W 16/14; H04W 74/0816; H04W 56/003; H04W 72/0453; H04W 74/002;
(Continued)

(56) References Cited

U.S. PATENT DOCUMENTS

2008/0112351 A1   5/2008 Surineni et al.
2009/0219879 A1*  9/2009 Zimmerman ...... H04Q 11/0478
                                                    370/329

(Continued)

OTHER PUBLICATIONS

Alcatel-Lucent Shanghai Bell et al., "Hidden Node Problem and Potential Solutions for LAA," 3GPP Draft; R1-144084—Hidden Node—Final. 3rd Generation Partnership Project (3GPP). Mobile Competence Centre; 650. Route Des Lucioles ; F-06921 Sophia-Antipolis Cedex ; France vol. RAN WG1. No. Ljubljana. Slovenia; Oct. 6, 2014-Oct. 10, 2014 Sep. 27, 2014 (Sep. 27, 2014). XP050872827. Retrieved from the Internet: URL:http://www.3gpp.org/ftp/tsgran/WG1_RL1/TSGR1_78b/Docs/—[retrieved on Sep. 27, 2014].

(Continued)

*Primary Examiner* — Pakee Fang
(74) *Attorney, Agent, or Firm* — Haynes and Boone, LLP

(57) ABSTRACT

Wireless communications systems and methods related to reservation signal transmission and detection for spectrum sharing are provided. A first wireless communication device communicates, with a second wireless communication device, a reservation request (RRQ) signal to reserve a transmission opportunity (TXOP) in a shared spectrum, wherein the shared spectrum is shared by a plurality of network operating entities, and wherein the first wireless communication device and the second wireless communication device are associated with a first network operating entity of the plurality of network operating entities. The first wireless communication device transmits a reservation response (RRS) signal indicating an interference tolerance level of the first wireless communication device.

21 Claims, 14 Drawing Sheets

Related U.S. Application Data

(60) Provisional application No. 62/457,687, filed on Feb. 10, 2017.

(51) Int. Cl.
| | |
|---|---|
| *H04W 74/08* | (2009.01) |
| *H04L 5/00* | (2006.01) |
| *H04L 5/26* | (2006.01) |
| *H04L 27/26* | (2006.01) |
| *H04W 56/00* | (2009.01) |
| *H04W 74/00* | (2009.01) |

(52) U.S. Cl.
CPC .......... *H04L 5/0073* (2013.01); *H04L 5/0091* (2013.01); *H04L 5/26* (2013.01); *H04W 74/0816* (2013.01); *H04L 5/0026* (2013.01); *H04L 27/2607* (2013.01); *H04L 27/2666* (2013.01); *H04W 56/003* (2013.01); *H04W 72/0453* (2013.01); *H04W 74/002* (2013.01)

(58) Field of Classification Search
CPC ... H04L 5/0016; H04L 5/0048; H04L 5/0073; H04L 5/0091; H04L 5/26; H04L 5/0026; H04L 27/2607; H04L 27/2666
See application file for complete search history.

(56) References Cited

U.S. PATENT DOCUMENTS

| | | | |
|---|---|---|---|
| 2012/0099449 | A1 | 4/2012 | Madan et al. |
| 2012/0243519 | A1 | 9/2012 | Koskela et al. |
| 2014/0241262 | A1 | 8/2014 | Novak et al. |
| 2015/0237609 | A1 | 8/2015 | Sun |
| 2016/0044711 | A1 | 2/2016 | Lou et al. |
| 2018/0234854 | A1 | 8/2018 | Zhang et al. |
| 2019/0191461 | A1* | 6/2019 | Lee ...................... H04L 1/1614 |

OTHER PUBLICATIONS

International Search Report and Written Opinion—PCT/US2018/013401—ISA/EPO—dated May 25, 2018.
Partial International Search Report—PCT/US2018/013401—ISA/EPO—dated Apr. 3, 2018.

* cited by examiner

RESERVATION SIGNAL FOR TRANSMISSION OPPORTUNITY DESIGN FOR SPECTRUM SHARING

CROSS REFERENCE TO RELATED APPLICATIONS

The present application is a divisional application of U.S. Non-Provisional patent application Ser. No. 15/650,047, filed Jul. 14, 2017, which claims priority to and the benefit of the U.S. Provisional Patent Application No. 62/457,687, filed Feb. 10, 2017, the disclosure of each of which is hereby incorporated by reference in its entirety.

TECHNICAL FIELD

This application relates to wireless communication systems, and more particularly to improving spectrum sharing among multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

A wireless communications system may operate over a shared spectrum, meaning that the wireless communications system includes one or more frequency bands that may be shared by multiple network operating entities. The shared spectrum may include unlicensed spectrum and/or licensed spectrum. In some instances, multiple network operating entities may share their licensed spectrum with each other to better utilize the spectrum. In some other instances, multiple network operating entities may obtain a licensed spectrum together.

An approach to sharing a spectrum is to employ a priority-based coordinated access scheme. In the priority-based coordinated access scheme, a shared spectrum is partitioned into multiple time periods. Each time period is designated for a particular type of access. For example, a time period can be allocated to a particular network operator for exclusive access of the shared spectrum, where no reservation from the particular network operator is required. Alternatively, a time period can be shared among multiple network operators on a priority basis with reservations. For example, a high priority network operator may have priority or guaranteed access of the shared spectrum in a time period, but requires a prior reservation of the time period. When the high priority network operator does not reserve the time period, a low priority network operator can opportunistically access the shared spectrum in the time period.

A reservation may include a reservation request (RRQ) signal and a reservation response (RRS) signal. For example, a BS of a high priority operator may transmit an RRQ signal to indicate a reservation and a transmission schedule for the time period. A target receiver may respond to the RRQ signal by transmitting an RRS signal. A low priority operator may monitor for an RRQ signal and/or an RRS signal from a high priority operator. Upon detection of an RRQ signal and/or an RRS signal, the low priority operator may yield spectrum access to the high priority operator. As such, the signaling of the RRS signal can protect data receptions at the target receiver from low priority operator nodes close to the target receiver. Thus, RRS signal detectability may be important for spectrum sharing. Accordingly, improved procedures for RRS signal transmission and detection may be desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device, a reservation request (RRQ) signal to reserve a transmission opportunity (TXOP) in a shared spectrum, wherein the shared spectrum is shared by a plurality of network operating entities, and wherein the first wireless communication device and the second wireless communication device are associated with a first network operating entity of the plurality of network operating entities; and transmitting, by the first wireless communication device, a reservation response (RRS) signal indicating an interference tolerance level of the first wireless communication device.

In an additional aspect of the disclosure, a method of wireless communication includes determining, by a first wireless communication device associated with a first network operating entity, a transmission configuration of a second wireless communication device associated with a second network operating entity; and monitoring, by the first wireless communication device, for a reservation for a transmission opportunity (TXOP) in a shared spectrum from the second network operating entity based on the transmission configuration, wherein the shared spectrum is shared by the first network operating entity and the second network operating entity.

In an additional aspect of the disclosure, a method of wireless communication includes communicating, by a first wireless communication device with a second wireless communication device, a reservation request (RRQ) signal to reserve a transmission opportunity (TXOP) in a shared spectrum, wherein the shared spectrum is shared by a plurality of network operating entities, and wherein the first wireless communication device and the second wireless communication device are associated with a first network operating entity of the plurality of network operating entities; communicating, by the first wireless communication device, a reservation response (RRS) signal in a frequency subband within shared spectrum; and communicating, by the first wireless communication device with the second wireless communication device, data during the TXOP in the frequency subband within the shared spectrum.

In an additional aspect of the disclosure, an apparatus includes a processor configured to communicate, with a second wireless communication device, a reservation request (RRQ) signal to reserve a transmission opportunity (TXOP) in a shared spectrum, wherein the shared spectrum is shared by a plurality of network operating entities, and wherein the apparatus and the second wireless communication device are associated with a first network operating entity of the plurality of network operating entities; and a transceiver configured to transmit a reservation response (RRS) signal indicating an interference tolerance level of the first wireless communication device.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
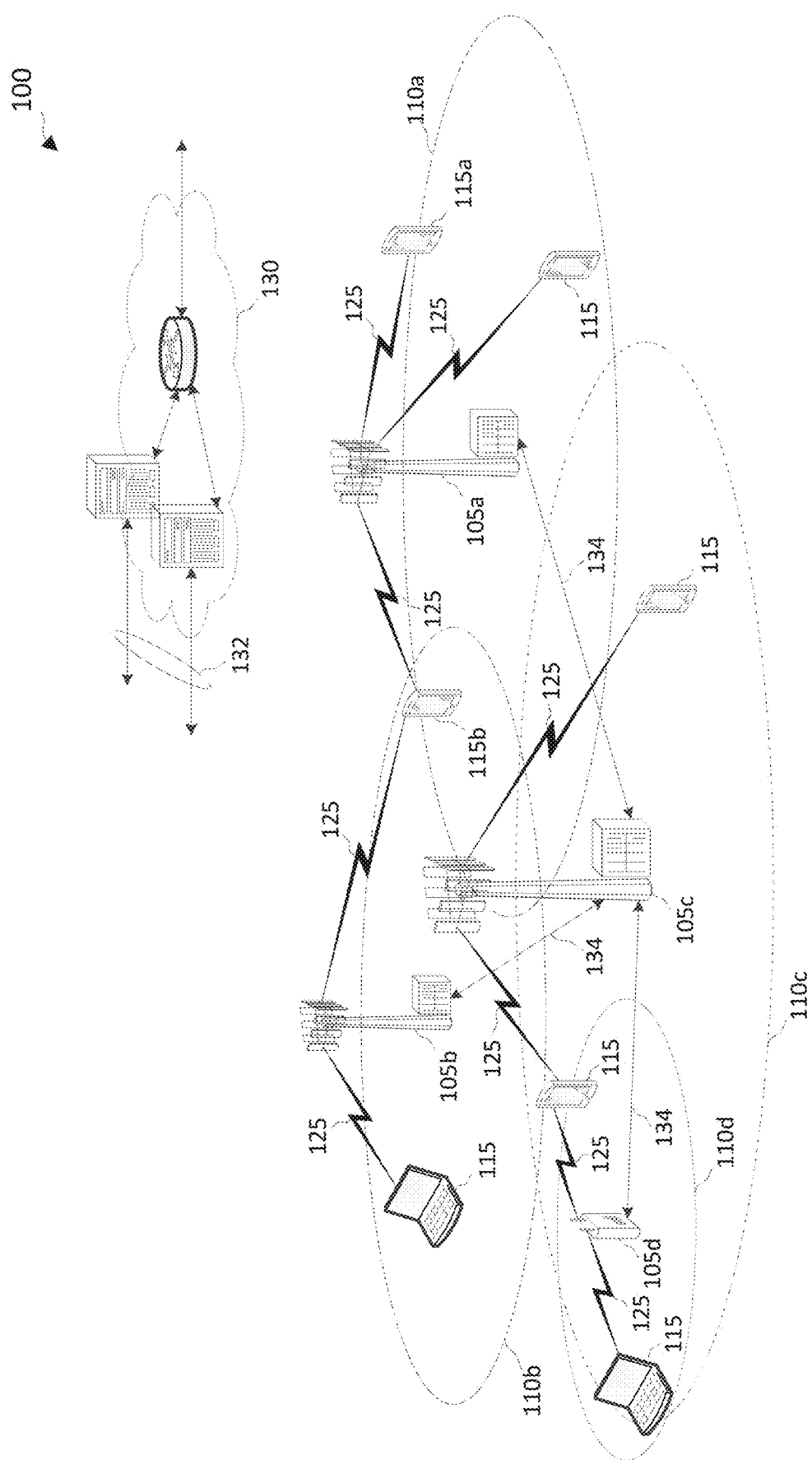
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present disclosure describes mechanisms for improving spectrum sharing among multiple network operating entities. In a priority-based spectrum sharing scheme, a spectrum is time-partitioned into transmission opportunities (TXOPs). Each TXOP is designated for prioritized use by a prioritized or high priority network operating entity and opportunistic use by low priority network operating entities based on reservations. For example, a granting BS can transmit a reservation request (RRQ) signal to reserve a TXOP. A target receiver can transmit an RRS signal to silence low priority nodes around the target receiver. The target receiver may be a BS for uplink (UL) communication or a user equipment (UE) for downlink (DL) communication. The disclosed embodiments include RRS power control mechanisms, RRS configuration mechanisms, RRS signal transmission mechanisms, and RRS signal detection mechanisms for improving resource utilization efficiency and reducing implementation complexity.

In an embodiment, a target receiver may transmit an RRS signal indicating an interference tolerance level of the target receiver. For example, the RRS signal can include a predetermined sequence and an interference tolerance level indication message. Alternatively, the target receiver can configure the RRS transmit power level based on the interference tolerance level. A low priority node can listen to the channel. Upon detection of an RRS signal from a high priority node, the low priority node can determine whether to yield based on the indicated interference tolerance level. For example, when a transmission of the low priority node is within the interference tolerance level, the low priority node may proceed with the transmission instead of yielding, and thus may improve spectrum utilization efficiency. In addition, the low priority node may determine the transmission power based on the indicated interference tolerance level.

In an embodiment, a low priority node can monitor for RRS signals from high priority nodes according to an RRS transmission configuration of the high priority nodes to increase the detectability of the RRS. The RRS transmission configuration can include configurations for a cyclic-prefix (CP), a numerology (e.g., symbol duration and subcarrier spacing), and/or a timing offset value.

In an embodiment, an RRS signal may include an SRS sequence common for all target receivers within an operator or across operators. A BS may semi-statically or dynamically configure resource information and/or SRS sequence parameters for SRS transmissions. The reuse of SRS sequences for RRS signal transmissions can minimize changes in physical layer processing. In an embodiment, RRS resource partitions can be based on signal measurements and/or interference relationships among nodes in a network. For example, UL RRS transmissions and DL RRS transmissions within an operator can be transmitted on FDM resources, and thus may improve resource utilization efficiency.

In an embodiment, a shared spectrum can be divided into multiple frequency subbands. A target receiver can transmit RRS signals associated with the scheduled frequency subbands. For example, the RRS signals may be transmitted in the scheduled frequency subbands to indicate a reservation for the scheduled frequency subbands. Alternatively, the RRS signals may include an indicator indicating the scheduled frequency subbands. A low priority node can monitor for RRS signals from a high priority operator associated with the frequency subbands and utilize the subbands that are not scheduled by the high priority operator. For example, transmissions of a low priority node and a high priority node may occur simultaneously over different frequency subbands. Therefore, the subband-specific RRS transmissions can improve resource utilization efficiency.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication tha UL communication. A UL-centric subframe may include a longer duration for UL communication tha UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the UEs 115 and the BSs 105 may be operated by multiple network operators or network operating entities and may operate in a shared radio frequency spectrum, which may include licensed or unlicensed frequency bands. The shared spectrum may be time-partitioned for sharing among the multiple network operating entities to facilitate coordinated communication. For example, in the network 100, the BS 105a and the UE 115a may be associated with one network operating entity, while the BS 105b and the UE 115b may be associated with another network operating entity. By time-partitioning the shared spectrum according to network operating entities, the communications between the BS 105a and the UE 115a and the communications between the BS 105b and the UE 115b may each occur during respective time periods and may avail themselves of an entirety of a designated shared spectrum.

To support coordinated access of the shared spectrum, a BS 105 or an entity of the core network 130 may act as a central arbitrator to manage access and coordinate the partitioning of resources among different network operating entities operating within the network 100. In some embodiments, the central arbitrator may include a spectrum access system (SAS). In addition, the transmissions from the multiple network operating entities can be time synchronized to facilitate the coordination.

Figure 2:
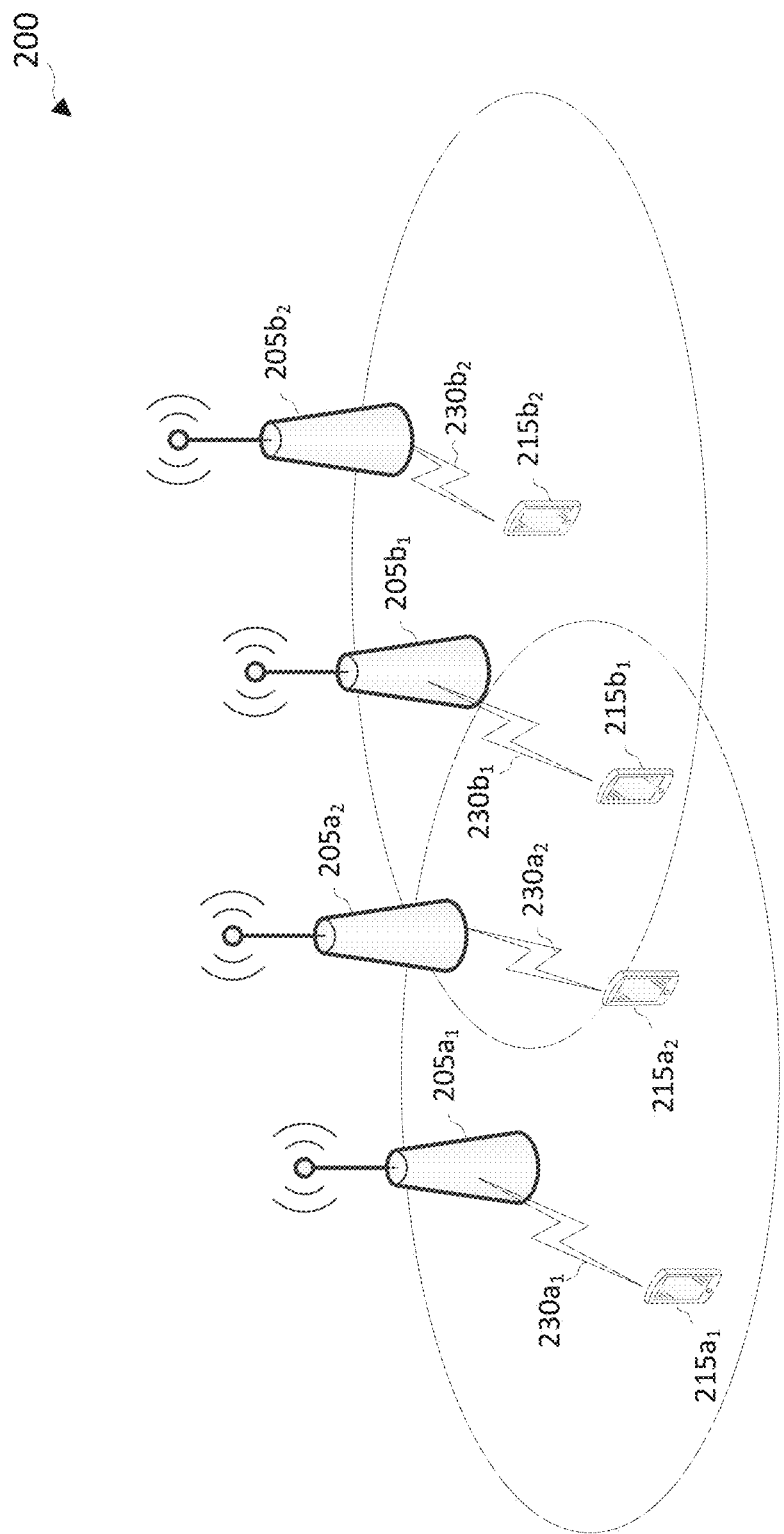
FIG. 2 illustrates an example of a wireless communications network that supports spectrum sharing with dynamic time-division duplexing (TDD) according to embodiments of the present disclosure.

FIG. 2 illustrates an example of a wireless communications network 200 that supports spectrum sharing with dynamic TDD according to embodiments of the present disclosure. The network 200 may be similar to the network 100. FIG. 2 illustrates four BSs 205 and four UEs 215 for purposes of simplicity of discussion, though it will be recognized that embodiments of the present disclosure may scale to many more UEs 215 and/or BSs 205. The BSs 205 and the UEs 215 may be similar to the BSs 105 and the UEs 115, respectively. The network 200 may be operated by multiple operators sharing a frequency spectrum. For example, Operator A may operate the BSs 205a and the UEs 215a, and Operator B may operate the BSs 205b and the UEs 215b.

The sharing of the frequency spectrum may be based on priorities and reservations. A shared spectrum can be time-partitioned into multiple periods. Each operator may be assigned with an access priority in each period. In addition, each link (e.g., a UL or a DL) within an operator may be assigned with an access priority in each period. The BSs 205 and the UEs 215 may communicate with each other in a period according to a corresponding operator priority and a corresponding link priority.

As an example, the BS $205a_1$ may serve the UE $215a_1$ in a DL direction over a link $230a_1$ in the shared spectrum during a first time period. The BS $205a_2$ may serve the UE $215a_2$ in a UL direction over a link $230a_2$ in the shared spectrum during a second time period. The BS $205b_1$ may serve the UE $215b_1$ in a DL direction over a link $230b_1$ in the shared spectrum during a third time period. The BS $205b_2$ may serve the UE $215b_2$ in a UL direction over a link $230b_2$ in the shared spectrum during a fourth time period. In some embodiments, some of the first, second, third, and fourth time periods can be the same time period based on interference among the BSs 205 and the UEs 215. For example, the DL transmission over the link $230a_1$ and the UL transmission over the link $230b_2$ may occur without causing significant interference to each other. The sharing mechanisms are described in greater detail herein.

Figure 3:
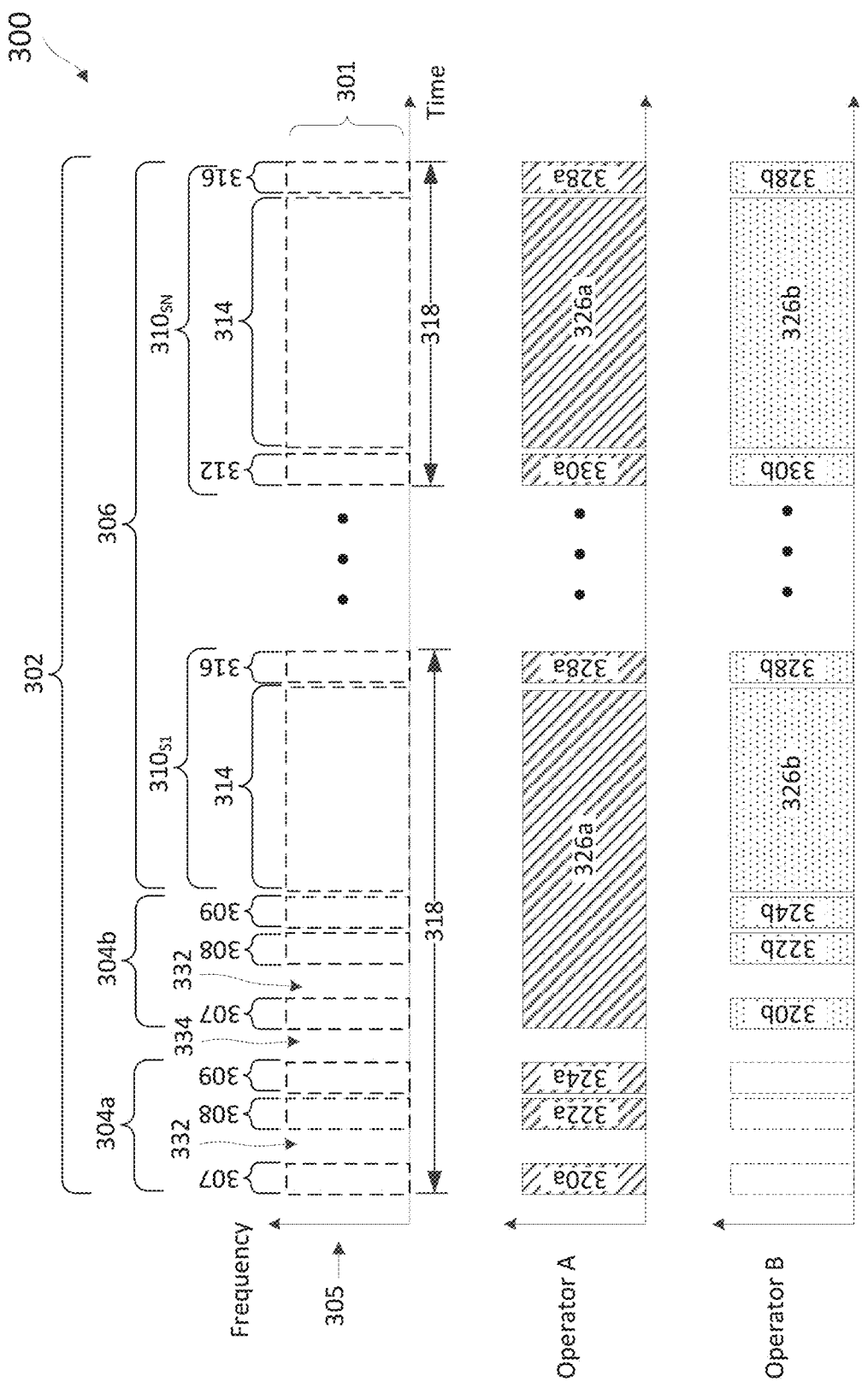
FIG. 3 illustrates a coordinated priority-based spectrum sharing scheme with interference management according to embodiments of the present disclosure.

FIG. 3 illustrates a coordinated priority-based spectrum sharing scheme 300 with interference management according to embodiments of the present disclosure. The x-axes represent time in some constant units. The y-axes represent frequency in some constant units. The scheme 300 may be employed by the BSs 105 and 205 and the UEs 115 and 215 to access a shared spectrum 301. While the scheme 300 illustrates coordinated spectrum access for two different network operating entities (e.g., Operator A and Operator B), the scheme 300 can be applied to any suitable number of network operating entities.

In the scheme 300, the spectrum 301 is time-partitioned into a plurality of transmit opportunities (TXOPs) 302 as shown in the frame structure 305. The TXOPs 302 may have a fixed duration and may be defined in units of OFDM symbols, subframes, slots, and/or any suitable time format. Each TXOP 302 includes a plurality of channel sensing or clear channel assessment (CCA) periods 304 followed by a transmission period 306. The CCA periods 304 are separated by a gap period 334. The structure 305 of the TXOP 302 is predetermined and known by all network operating entities sharing the shared spectrum. The network operating entities may be time-synchronized when operating in the shared spectrum 301.

Each CCA period 304 is assigned to a particular network operating entity (e.g., Operator A or Operator B). The assigned network operating entity may transmit a reservation in the CCA period 304 to reserve the following transmission period 306. Each CCA period 304 includes portions 307, 308, and 309. The portions 307 and 308 are separated by a gap period 332. The portions 307 are used for transmitting RRQ signals 320. Each RRQ signal 320 may include a predetermined preamble sequence, a request-to-send (RTS) signal, and/or transmission triggers (e.g., scheduling information). The portions 308 are used for transmitting RRS signals 322 for operator-level sharing (e.g., across operators). The portions 309 are used for transmitting RRS signals 324 for link-level sharing (e.g., between UL and DL) within an operator. Each of the RRS signals 322 and 324 may include a predetermined preamble sequence or a clear-to-send (CTS) signal. The CCA periods 304 can be arranged in a decreasing order of priorities. Thus, a low priority operator node can monitor the channel (e.g., the shared spectrum 301) in the CCA periods 304 of higher priorities. Upon detection of a reservation from a high priority operator node, the low priority operator node may refrain from transmitting in the following transmission period 306. The gap period 334 allows low priority operator nodes to process the reservation of a higher priority operator. The gap period 332 allows for switching between UL and DL processing.

The transmission period 306 includes a plurality of sub-periods 310 shown as $310_{S1}$ to $310_{SN}$. The first sub-period $310_{S1}$ includes portions 314 and 316. The remaining sub-periods 310 in the transmission period 306 include portions 312, 314, and 316. The portions 312 are used for transmitting DL controls 330 (e.g., UL or DL triggers) for corresponding portions 314. The portions 314 are used for transmitting UL or DL data 326 based on corresponding triggers. The portions 316 are used for transmitting UL controls 328, such as scheduling request (SR) and hybrid automatic repeat request (HARQ) information. In an embodiment, the TXOP 302 is divided into a number of slots 318. The first slot 318 includes the CCA periods 304 and the sub-period $310_{S1}$. The remaining slots 318 correspond to the remaining sub-periods 310.

As an example, Operator A has priority over Operator B in the particular TXOP 302. As such, the high-priority CCA period 304a is assigned to Operator A and the low-priority CCA period 304b is assigned to Operator B. Thus, Operator A nodes has prioritized access in the transmission period 306, while Operator B nodes may opportunistically access the transmission period 306 when the transmission period 306 is not reserved by Operator A nodes. In addition, the default link direction is DL within Operator A and within Operator B during the TOXP 302. Thus, the transmission priorities in order are Operator A DL, Operator A UL, Operator B DL, and Operator B UL. The patterned boxes represent signal transmissions. The dashed boxes are included as references to the TXOP structure 305 without signal transmission.

For prioritized access, a DL-granting BS of Operator A may transmit an RRQ signal 320a in the portion 307 of the CCA period 304a to reserve the following transmission period 306. The RRQ signal 320a may include a DL trigger. For dynamic TDD within Operator A, a UL-granting BS of Operator A may transmit an RRQ signal 320a including a UL trigger in the same portion 307 of the CCA period 304a based on reuse one. Operator A triggered nodes may transmit an RRS signal 322a in the portion 308 of the CCA period 304a to silence Operator B nodes (e.g., low priority operator). Operator B nodes may monitor the CCA period 304a for an RRQ signal 320a and/or an RRS signal 322a from Operator A. Upon detection of the RRQ signal 320a and/or the RRS signal 322a, Operator B nodes may yield spectrum access to Operator A.

A DL-triggered UE (e.g., the target receiver) may transmit an RRS signal 324a in the portion 309 of the CCA period 304a to silence Operator A nodes of a lower link priority (e.g., UL). Subsequently, the DL-granting BS may transmit data 326a to the DL-triggered UE in the portion 314 of the sub-period $310_{S1}$. The DL-triggered UE may transmit UL control 328a in the portion 316 of the sub-period $310_{S1}$. In subsequent sub-periods 310, the DL-granting BS may trigger one or more other UEs for DL communications. In some embodiments, the transmission period 306 may begin after the CCA period 304a (e.g., occupying the low-priority CCA period 304b).

The UL-triggered UE may monitor for an RRS signal 324a in the portion 309 of the CCA period 304a. When no RRS signal 324a is detected, the UL-triggered UE may dynamically switch the link priority to UL and transmit data 326a and a UL control 328a to the UL-granting BS during the portions 314 and 316, respectively, of the sub-period $310_{S1}$. When there are lower priority operator nodes, the UL-granting BS (e.g., the target receiver) may transmit an RRS signal 322a during the portion 309 of the CCA period 304a to silence low priority nodes near the UL-granting BS. In subsequent sub-periods 310, the UL-granting BS may trigger one or more other UEs for UL communications. While the dynamic TDD mechanisms are described in the context of switching a link priority from DL to UL, similar mechanisms can be applied to a link priority from UL to DL.

When the shared spectrum 301 is not reserved by Operator A, Operator B can opportunistically access the TXOP 302 using similar mechanisms as Operator A. For example, a UL-granting BS and/or a DL-granting BSs of Operator B may transmit RRQ signals 320b in the portion 307 of the assigned CCA period 304b to trigger DL and/or UL communications of data 326b. Operator B triggered nodes can transmit an RRS signal 322b in the portion 308 of the CCA period 304b when there are lower priority operator. A DL-triggered UE can transmit an RRS signal 324b in the portion 309 of the CCA period 304b. Subsequently, the DL-granting BS can transmit data 326b to the DL-triggered UE in the portion 314 of the sub-period $310_{S1}$. The DL-triggered UE can transmit UL control 328b in the portion 316 of the sub-period $310_{S1}$. To switch the link priority from the default link priority, the UL-triggered UE may monitor for an RRS signal 324b in the portion 309. When no RRS signal 324b is detected, the UL-triggered UE may transmit data 326b and a UL control 328b to the UL-granting BS during the portions 314 and 316, respectively, of the sub-period $310_{S1}$.

Figure 4:
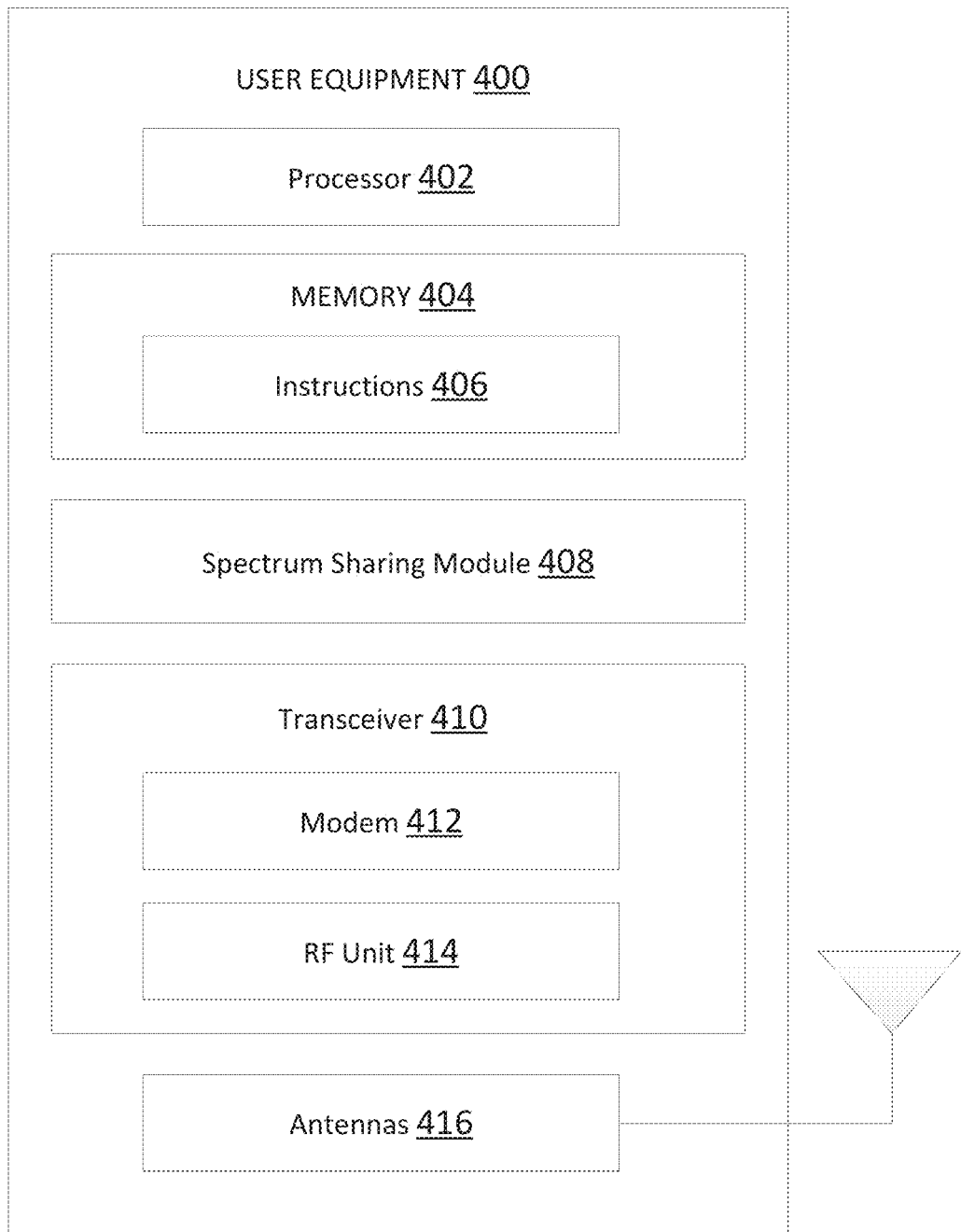
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115 or 215 as discussed above. As shown, the UE 400 may include a processor 402, a memory 404, a spectrum sharing module 408, a transceiver 410 including a modem subsystem 412 and a radio frequency (RF) unit 414, and an antenna 416. These elements may be in direct or indirect communication with each other, for example via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 215 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The spectrum sharing module 408 may be used for various aspects of the present disclosure. For example, the spectrum sharing module 408 is configured to identify TXOPs in a shared spectrum, perform network listening, reserve time periods for communication, perform RRS power controls to increase RRS signal detectability, and/or determine RRS transmission configurations of other operators for the network listening, as described in greater detail herein.

As shown, the transceiver 410 may include the modem subsystem 412 and the RF unit 414. The transceiver 410 can be configured to communicate bi-directionally with other devices, such as the BSs 105 and 205. The modem subsystem 412 may be configured to modulate and/or encode the data from the memory 404 and/or the dynamic medium sharing module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 215 or a BS 205. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 215 to enable the UE 215 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example, transmission of clear-to-send (CTS) signals according to embodiments of the present disclosure. The antenna 416 may further receive data messages transmitted from other devices. This may include, for example, reception of request-to-send (RTS) and/or CTS signals according to embodiments of the present disclosure. The antenna 416 may provide the received data messages for processing and/or demodulation at the transceiver 410. Although FIG. 4 illustrates antenna 416 as a single antenna, antenna 416 may include multiple antennas of similar or different designs in order to sustain multiple transmission links. The RF unit 414 may configure the antenna 416.

Figure 5:
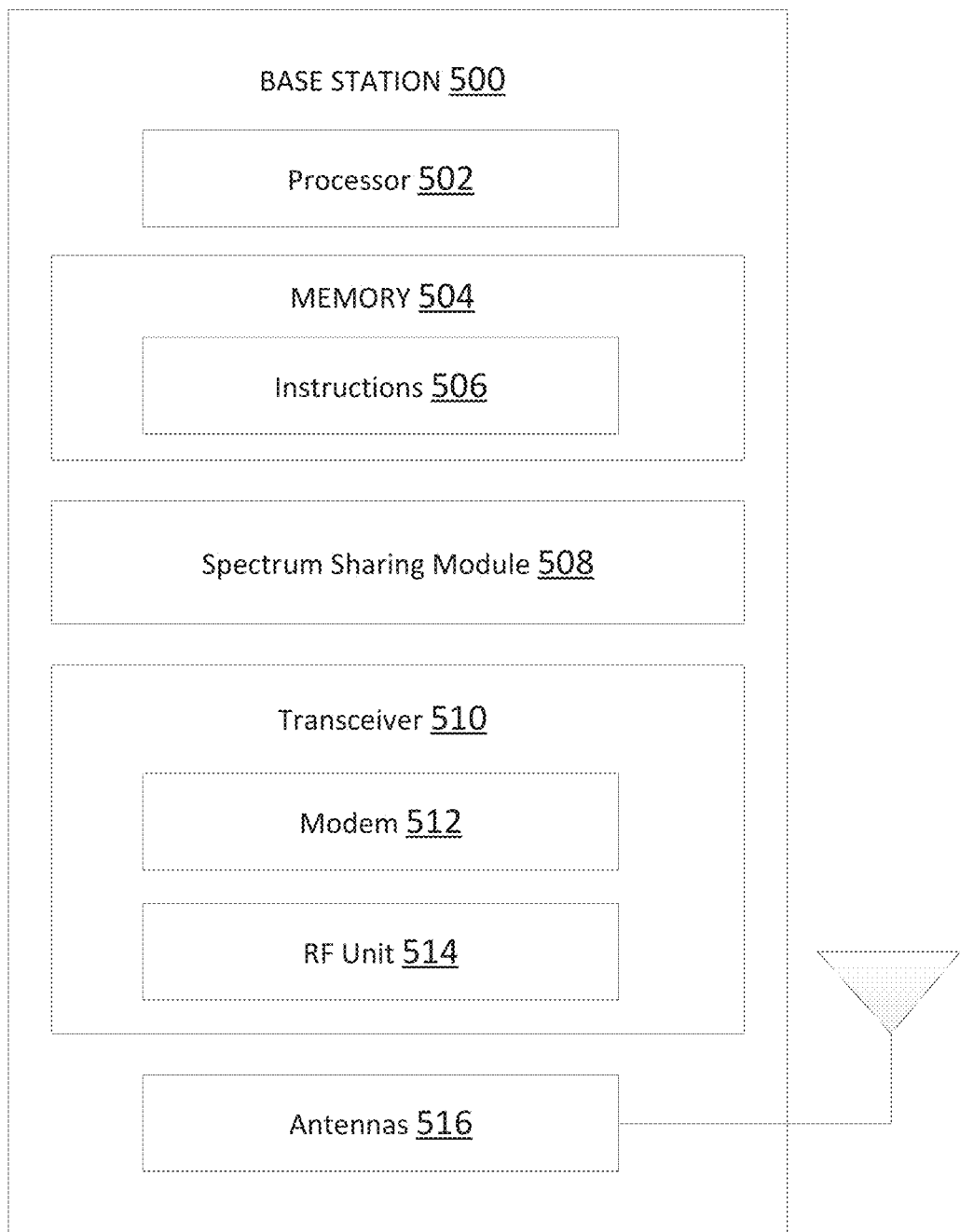
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 or 205 as discussed above. A shown, the BS 500 may include a processor 502, a memory 504, a spectrum sharing module 508, a transceiver 510 including a modem subsystem 512 and a RF unit 514, and an antenna 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 5.

The spectrum sharing module 508 may be used for various aspects of the present disclosure. For example, the spectrum sharing module 508 is configured to identify TXOPs in a shared spectrum, perform network listening, reserve time periods for communication, perform RRS power controls to increase RRS signal detectability, and/or configure RRS resource and transmission configurations, as described in greater detail herein.

As shown, the transceiver 510 may include the modem subsystem 512 and the RF unit 514. The transceiver 510 can be configured to communicate bi-directionally with other devices, such as the UEs 115 and 215 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 215. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 205 to enable the BS 205 to communicate with other devices.

The RF unit 514 may provide the modulated and/or processed data, e.g. data packets (or, more generally, data messages that may contain one or more data packets and other information), to the antenna 516 for transmission to one or more other devices. This may include, for example, transmission of information to complete attachment to a network and communication with a camped UE 215 according to embodiments of the present disclosure. The antenna 516 may further receive data messages transmitted from other devices and provide the received data messages for processing and/or demodulation at the transceiver 510. Although FIG. 5 illustrates antenna 516 as a single antenna, antenna 516 may include multiple antennas of similar or different designs in order to sustain multiple transmission links.

Figure 6:
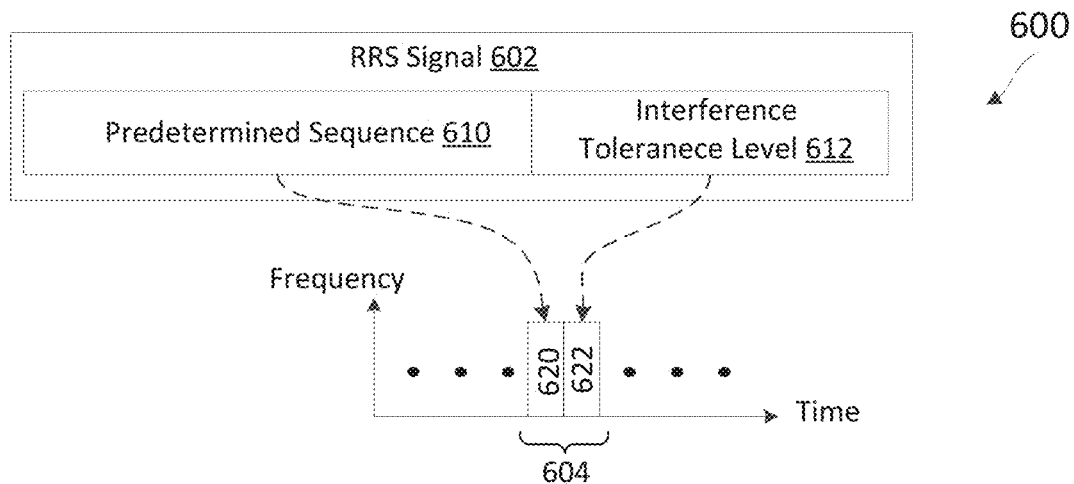
FIG. 6 illustrates a reservation response (RRS) signal transmission scheme that provides interference information according to embodiments of the present disclosure.

FIGS. 6-9 illustrate various interference tolerance level determination and indication mechanisms that may be employed by a target receiver to improve resource utilization efficiency. The target receiver may be a UE (e.g., the UEs 115, 215, and 400) for DL communication or a BS (e.g., the BSs 105, 205, and 500) for UL communication. FIG. 6 illustrates an RRS signal transmission scheme 600 that provides interference information according to embodiments of the present disclosure. In the scheme 600, a target receiver (e.g., Operator A nodes) may transmit an RRS signal 602 (e.g., the RRS signals 322 and 324) at a fixed power level and indicate an interference tolerance level 612 of the target receiver. In an embodiment, the target receiver may transmit the RRS signal 602 at a maximum power level to enable a maximum clearance or detectability at low priority operator nodes (e.g., Operator B nodes).

When a low priority transmitter node detected the RRS signal 602, the low priority transmitter node can determine whether to yield spectrum access based on the interference tolerance level 612 and a received power of the RRS signal 602 at the low priority transmitter node. For example, the low priority node may determine that a transmission of the low priority node is within the indicated interference tolerance level 612, the low priority node may proceed with the transmission instead of yielding. Thus, the transmissions of the low priority node and the high priority node can occur simultaneously over a shared spectrum (e.g., the shared spectrum 301).

The RRS signal 602 can include a predetermined sequence 610 and the interference tolerance level 612 of the target receiver. The predetermined sequence 610 can be transmitted on a resource 620 within an RRS period 604 (e.g., the portions 308 and 309). The interference tolerance level 612 can be transmitted on a resource 622 within the RRS period 604. The resource 620 may be a common RRS resource for all target receivers within an operator (e.g., Operator A or Operator B), whereas the resource 622 may be a receiver-specific resource since the interference tolerance level 612 is specific to the target receiver. The resources 620 and 622 are shown as time-division multiplexing (TDM) resources in FIG. 6, but can be any combination of TDM and/or FDM resources.

While the scheme 600 illustrates the indication of the interference tolerance level 612 as a separate indication or a separate message, the RRS signal 602 can be alternatively configured to include a particular sequence that indicates the interference tolerance level 612. For example, a set of predetermined sequences can be used for RRS signal 602 transmissions, where each predetermined sequence has a correspondence to a particular interference tolerance level. As such, a target receiver may select a predetermined sequence corresponding to the interference tolerance level 612 of the target receiver and the RRS signal 602 can carry the selected predetermined sequence. The transmission of the selected predetermined sequence can be on a receiver-specific resource or single frequency network resource shared by RRS transmissions of other nodes.

Figure 7:
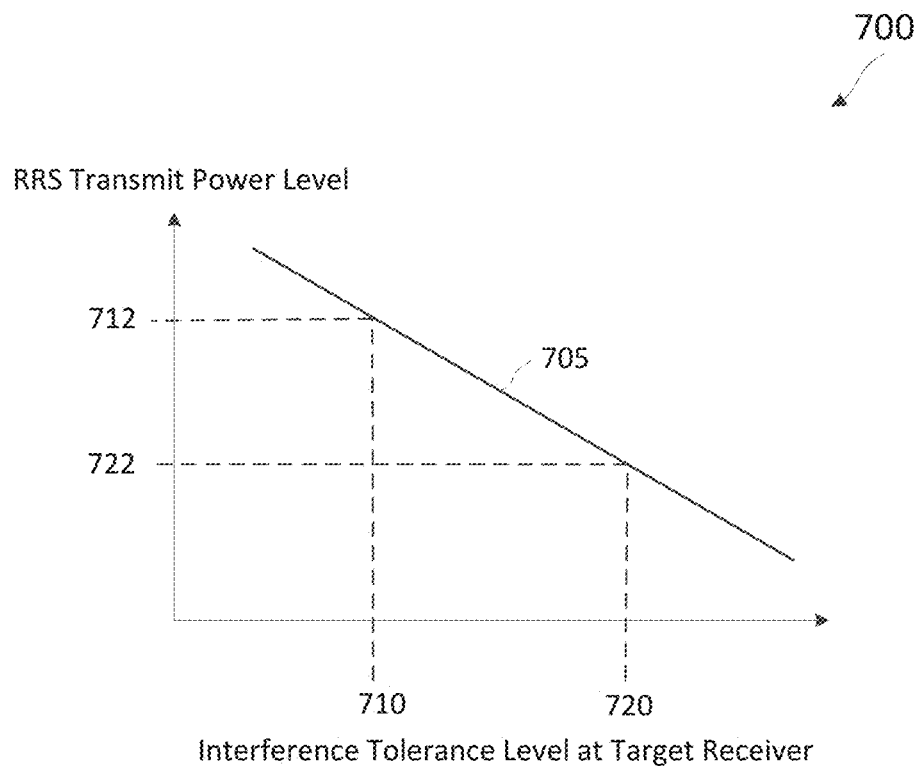
FIG. 7 illustrates an RRS signal transmission scheme that provides interference information according to embodiments of the present disclosure.

FIG. 7 illustrates an RRS signal transmission scheme 700 that provides interference information according to embodiments of the present disclosure. The x-axis represents interference tolerance levels at target receivers in some constant units. The y-axis represents RRS transmit power levels in some constant units. In the scheme 700, a target receiver can transmit an RRS signal (e.g., the RRS signals 322 and 324) at a transmit power level based on the interference tolerance level of the target receiver. For example, when the target receiver has a low interference tolerance level, the target receiver may transmit the RRS signal at a high power level to increase the probability of low priority transmitters yielding to the target receiver. As shown, a target receiver with a low interference tolerance level 710 may transmit an RRS signal at a high power level 712, whereas a target receiver with a high interference tolerance level 720 may transmit an RRS signal at a low power level 722. While the scheme 700 illustrates a linear relationship 705 between the interference tolerance levels and the RRS transmit power levels, the interference tolerance levels and the RRS transmit power levels can be configured according to any suitable relationship.

The scheme 700 may be less complex when compared to the scheme 600. For example, in the scheme 700, all target receivers of a link priority (e.g., DL or UL) within an operator (e.g., Operator A or Operator B) may transmit RRS signals on the same resource (e.g., the resource 620). Thus, low priority nodes may monitor a single resource location for RRS signals from high priority nodes instead of multiple receiver-specific resources. The low priority nodes can determine whether to yield to high priority nodes based on a total received power of all RRS signals.

Figure 8:
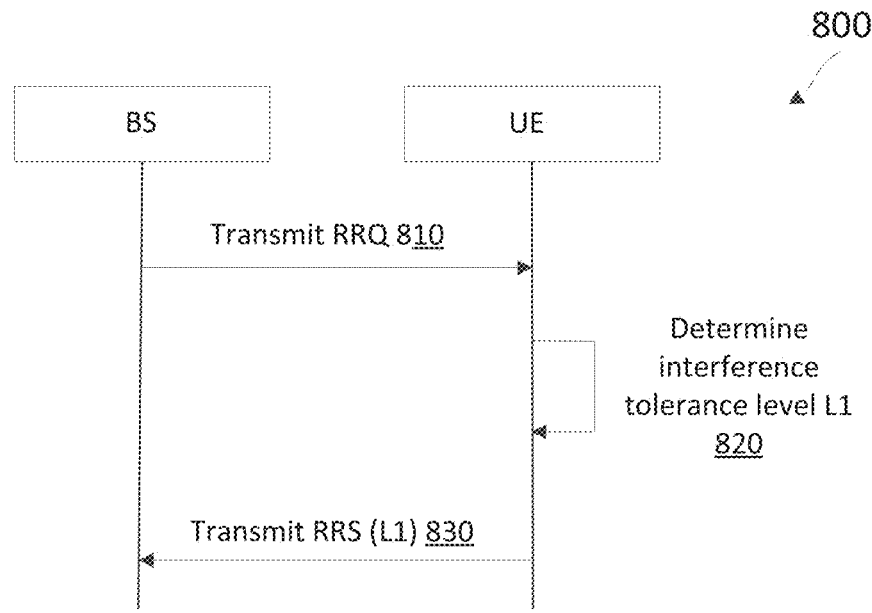
FIG. 8 is a signaling diagram of an interference tolerance determination method according to embodiments of the present disclosure.

FIG. 8 is a signaling diagram of an interference tolerance determination method 800 according to embodiments of the present disclosure. Steps of the method 800 can be executed by a computing device (e.g., a processor, processing circuit, and/or other suitable component) of a wireless communication device, such as the BSs 105, 205, and 500 and the UEs 115, 215, and 400. The method 800 may be used in conjunction with the schemes 300, 600, and/or 700. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 810, a BS may transmit an RRQ signal (e.g., the RRQ signal 320) to reserve a transmission period (e.g., the transmission period 306). The RRQ signal can include a DL trigger (e.g., a schedule) for a UE served by the BS.

At step 820, the UE (e.g., the target receiver) may determine an interference tolerance level, denoted as L1, at the UE. In one embodiment, the UE may determine the interference tolerance level L1 based on a transmit power of the UE. For example, the transmit power may be a maximum transmit power or a nominal transmit power of the UE. In another embodiment, the BS (e.g., the target transmitter) may provide transmit power information to the UE. For example, the BS may include the transmit power information in the RRQ signal transmitted at step 810. The UE may determine the interference tolerance level L1 based on the transmit power information.

At step 830, the UE may transmit an RRS signal (e.g., the RRS signal 322, 324, and 602) indicating the determined interference tolerance level L1, for example, by employing the scheme 600 or 700.

Figure 9:
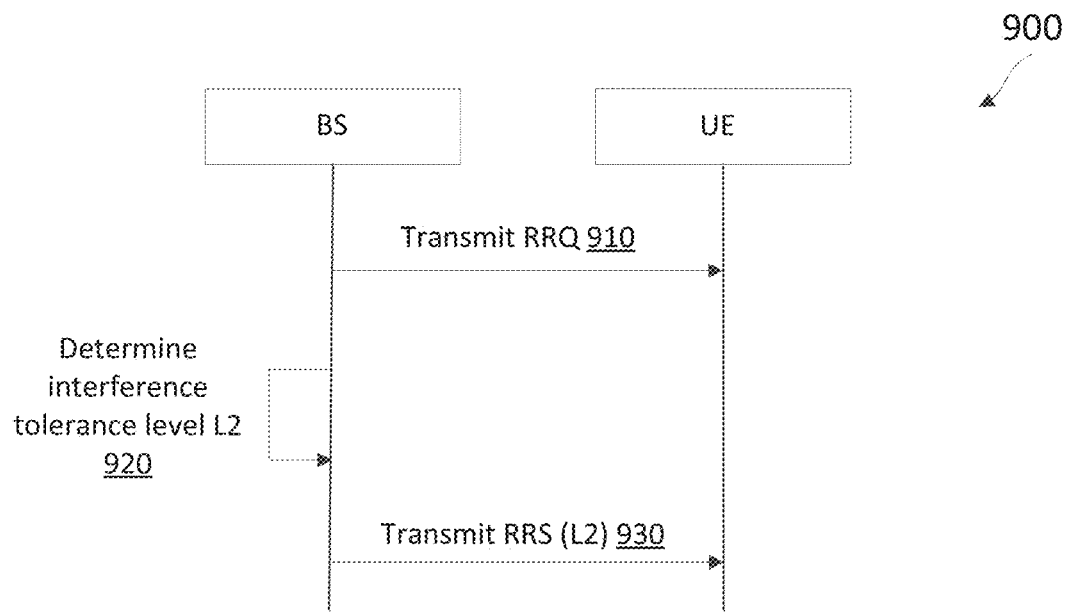
FIG. 9 is a signaling diagram of an interference tolerance determination method according to embodiments of the present disclosure.

FIG. 9 is a signaling diagram of an interference tolerance determination method 900 according to embodiments of the present disclosure. Steps of the method 900 can be executed by a computing device (e.g., a processor, processing circuit, and/or other suitable component) of a wireless communication device, such as the BSs 105, 205, and 500 and the UEs 115, 215, and 400. The method 900 may be used in conjunction with the scheme 300, 600, and/or 700. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, a BS may transmit an RRQ signal (e.g., the RRQ signal 320) to reserve a transmission period (e.g., the transmission period 306). The RRQ signal can include a UL trigger (e.g., a schedule) for a UE served by the BS.

At step 920, the BS (e.g., the target receiver) may determine an interference tolerance level, denoted as L2, at the BS. In one embodiment, the BS can receive transmit power information from the UE (e.g., the target transmitter) in a separate message or signal and determine the interference tolerance level L2 based on the UE's transmit power information. In another embodiment, the BS can determine the interference level L2 based on a total received power from multiple UEs served by the BS since the total received power from the multiple UEs may not vary significantly over time.

At step 930, the BS may transmit an RRS signal (e.g., the RRS signal 322, 324, and 602) indicating the determined interference tolerance level L2, for example, by employing the scheme 600 or 700.

Figure 10:
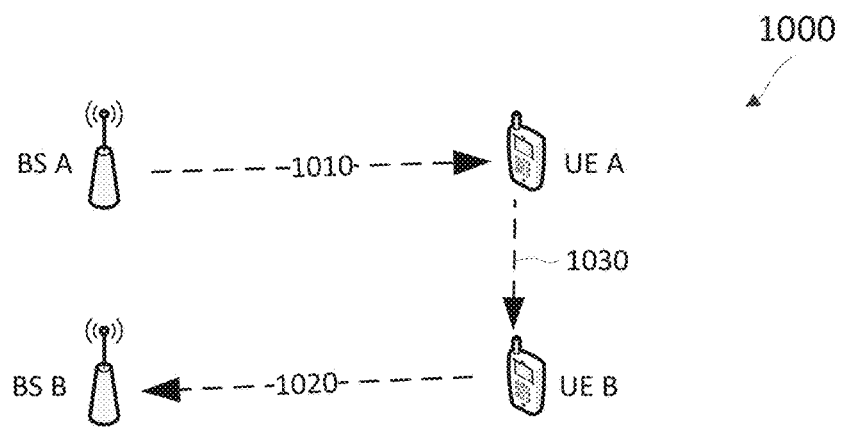
FIG. 10 illustrates an RRS signal detection scenario according to embodiments of the present disclosure.
Figure 11:
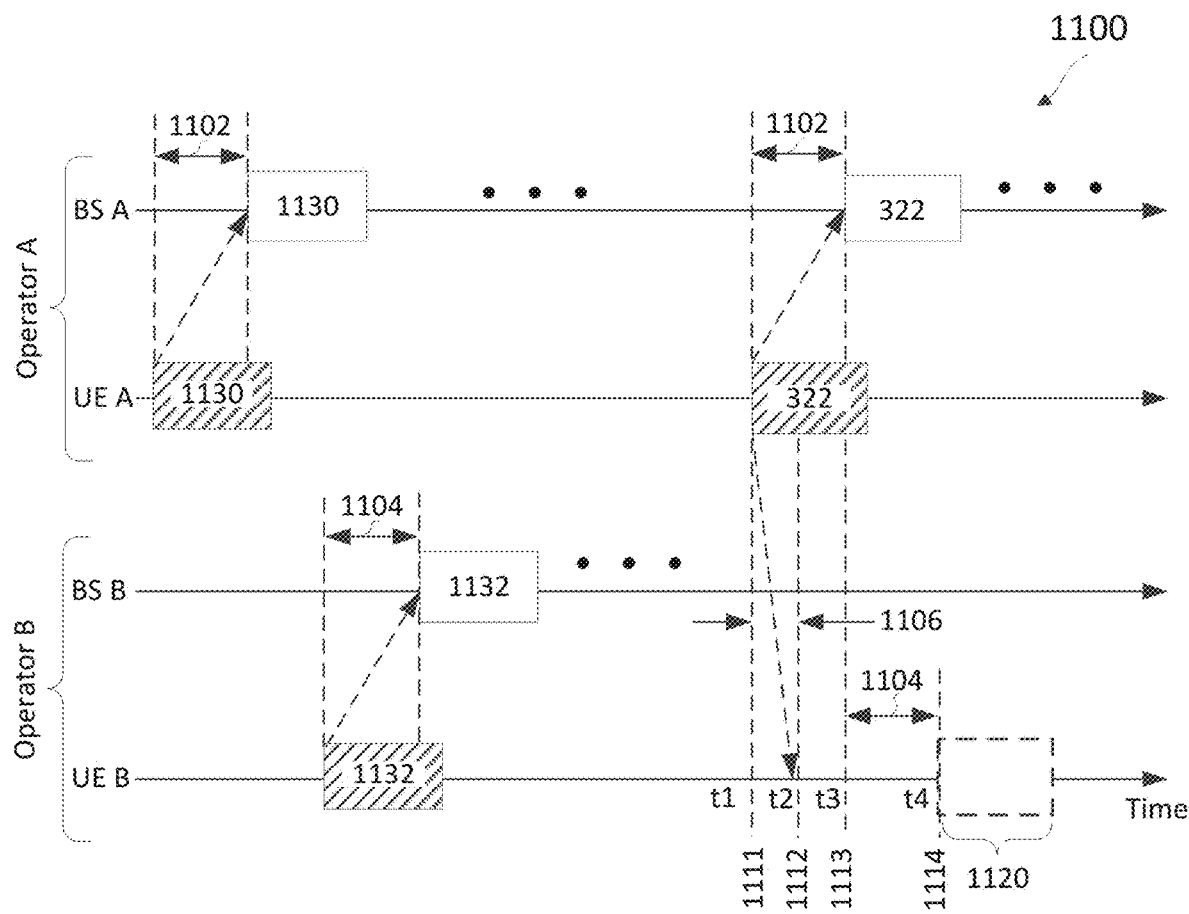
FIG. 11 is a timing diagram illustrating an RRS signal detection scheme according to embodiments of the present disclosure.

FIGS. 10 and 11 illustrate various receive fast Fourier transform (FFT) timing adjustment mechanisms that may be employed by the BSs 105 and 205 and the UEs 115 and 215 to improved RRS signal detectability. FIG. 10 illustrates an RRS signal detection scenario 1000 according to embodiments of the present disclosure. The scenario 1000 illustrates RRS signal detection in a network such as the networks 100 and 200. In the scenario 1000, a BS A serves a UE A, while a BS B serves a UE B. In a particular TXOP (e.g., the TXOP 302), the BS A and the UE A may have priority over the BS B and the UE B. The BS A may reserve the TXOP for a DL communication with the UE A as shown by the arrow 1010, while the BS B may reserve the TXOP for UL communication with the UE B as shown by the arrow 1020. The reservation and scheduling mechanisms may be as described in the scheme 300. The UE A may transmit an RRS signal (e.g., the RRS signal 322, 324, and 602) to silence low priority nodes (e.g., the UE B) around the UE A. The UE B may monitor for the RRS signal as shown by the arrow 1030.

The UE A may be configured with a timing advance (TA) (e.g., a TA A value) based on a round trip delay or a propagation delay with respect to the BS A. Thus, the UE A may transmit the RRS signal with a timing advance adjustment based on the TA A value. Similarly, the UE B may be configured with a TA (e.g., a TA B value) based on a round trip delay or a propagation delay with respect to the BS B.

Under a normal operation, the UE B may monitor for signals with a timing delay adjustment based on the TA B value. However, when the UE B is close to the UE A, the UE B may apply a receive timing offset in addition to a channel delay spread in order to detect the RRS signal from the UE A, as described in greater detail herein.

FIG. 11 is a timing diagram illustrating an RRS signal detection scheme 1100 according to embodiments of the present disclosure. The scheme 1100 is described in the context of the scenario 1000. As an example, the BS B and the BS A may be synchronized in time. The BS A may determine a propagation delay 1102 between the BS A and the UE A, for example, based on a signal 1130 received from the UE A during a RACH procedure. The BS A may instruct the UE A to apply a TA value for communication with the BS A based on the propagation delay 1102. Thus, the UE A may transmit an RRS signal 322 at an earlier time 1111, denoted as t1, to account for the propagation delay 1102 so that the RRS signal 322 can arrive at the BS A at a designated time 1113, denoted as t3.

Similarly, the BS B may determine a propagation delay 1104 between the BS B and the UE B based on a signal 1132 received from the UE B during a RACH procedure and instruct the UE B to apply a TA value for communication with the BS B based on the propagation delay 1104. During a normal operation, the UE B may account for the propagation delay 1104 during signal receptions by delaying the reception time. For example, the UE B may configure an RRS monitor window 1120 at a later time 1114, denoted as t4, for a reception of the RRS signal 322 based on the BS B timing (e.g., the time 1113). However, when the UE B is close to the UE A, the RRS signal 322 may arrive at the UE B at a time 1111, denoted as t2, earlier than the configured time 1114. Thus, by delaying the reception time according to the propagation delay 1104, the UE B may miss the detection of the RRS signal 322. To avoid the missed detection, the UE B can adjust the RRS monitor window 1120 based on a timing or propagation delay 1106 towards the UE A. The UE B may apply a timing offset value when placing the RRS monitor window 1120. For example, the UE B may shift the RRS monitor window 1120 to an earlier time 1112, denoted as t2.

In addition to TA differences, the BS A and B and the UE A and B may transmit RRS signals based on a symbol duration and/or subcarrier spacing different from regular data transmission. For example, operators can configure a different symbol duration and/or a different subcarrier spacing for RRS signals compared to regular data transmissions. For example, an operator may extend the symbol duration for RRS signal transmissions to reach nodes further away or shorten the symbol duration to reduce RRS overheads. The differences in TA, symbol duration, and/or subcarrier spacing can degrade the detectability of the RRS signal 322 at low priority nodes. To account for the differences or prevent inter-carrier interference, a CP can be added to the RRS symbol. The CP length can be selected based on the worst case or the greatest timing difference among nodes in the network.

Figure 12:
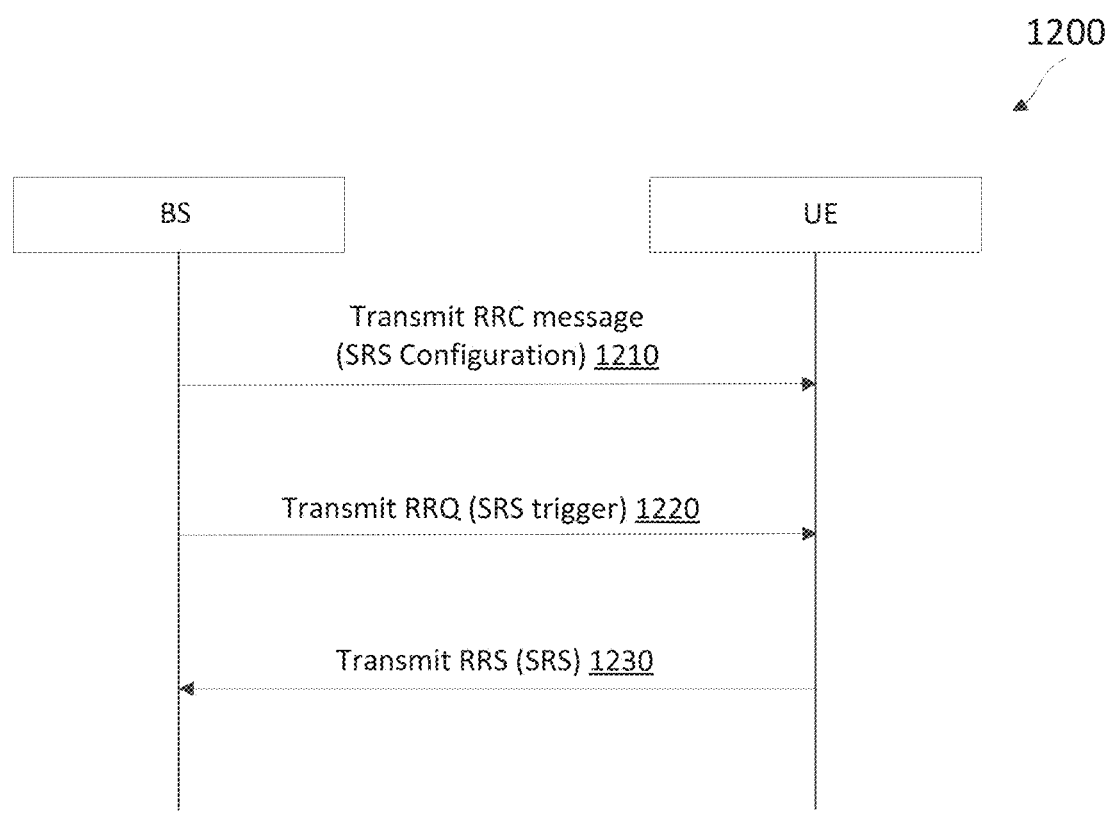
FIG. 12 is a signaling diagram of an RRS signal transmission method according to embodiments of the present disclosure.

FIG. 12 is a signaling diagram of an RRS signal transmission method 1200 according to embodiments of the present disclosure. Steps of the method 1200 can be executed by a computing device (e.g., a processor, processing circuit, and/or other suitable component) of a wireless communication device, such as the BSs 105, 205, and 500 and the UEs 115, 215, and 400. The method 1200 may be used in conjunction with the schemes 300, 600, 700, and/or 1100 and the methods 800 and 900. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

The method 1200 utilizes SRSs for RRS signal transmissions. In the LTE context, UEs may transmit UE-specific SRSs for channel sounding. For example, SRSs may be generated based on a base sequence with UE-specific cyclic shifts. However, RRS signal transmissions are for interference management among operators, for example, to indicate a spectrum reservation to other operators. Thus, a common SRS may be employed across nodes within an operator and/or across operators. In some embodiments, different operators can employ different SRSs.

At step 1210, a BS may transmit an RRC message including an SRS configuration. The SRS configuration can include SRS transmission resource information (e.g., time and/or frequency locations) and SRS sequence information (e.g., a base sequence and a cyclic shift). In an embodiment, the SRS configuration can include UE-specific SRS parameters for sounding and common SRS parameters for RRS signal transmissions.

At step 1220, the BS may transmit an RRQ signal (e.g., the RRQ signal 320) to reserve a TXOP (e.g., the TXOP 302) for communication with a UE. In an embodiment, the BS may dynamically update an SRS configuration by including an SRS trigger in the RRQ signal. For example, the SRS trigger can include SRS sequence parameters and/or SRS transmission resource information.

At step 1230, in response to the RRQ signal, the UE may transmit an RRS signal (e.g., the RRS signals 322, 324, and 602) based on the SRS trigger. For example, the RRS signal includes an SRS sequence corresponding to the SRS parameters in the SRS trigger and may be transmitted on the resource indicated in the SRS trigger. In some embodiments, the RRQ signal may not include the dynamic SRS configuration in the SRS trigger. In such embodiments, the UE may transmit the SRS according to the SRS configuration in the RRC message.

Figure 13:
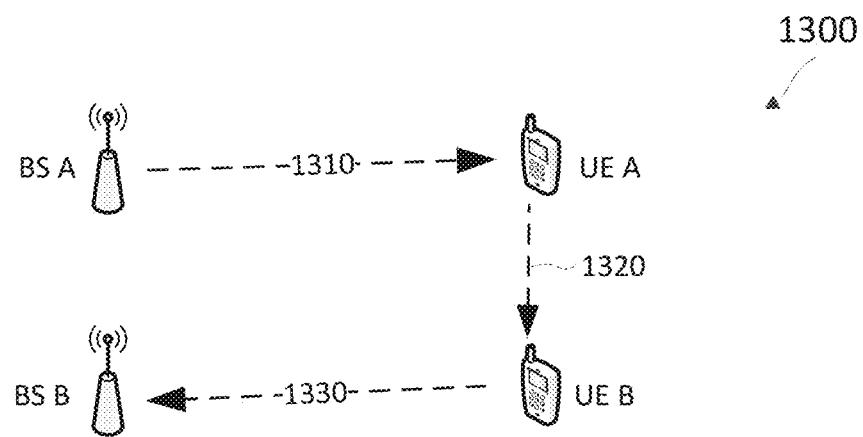
FIG. 13 illustrates a subband-specific RRS signal transmission scenario according to embodiments of the present disclosure.
Figure 14:
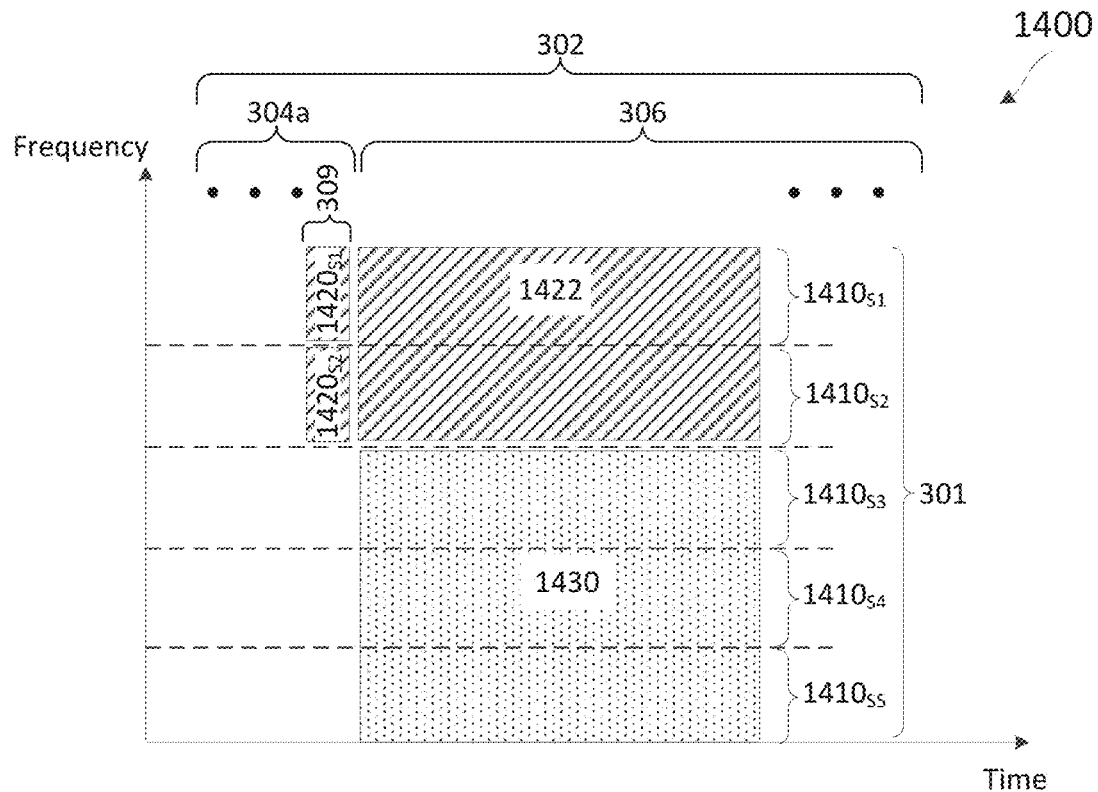
FIG. 14 illustrates a subband-specific RRS signal transmission scheme according to embodiments of the present disclosure.

FIGS. 13 and 14 illustrate various subband-specific RRS signal transmission mechanisms that may be employed by the BSs 105 and 205 and the UEs 115 and 215. FIG. 13 illustrates a subband-specific RRS signal transmission scenario 1300 according to embodiments of the present disclosure. The scenario 1300 illustrates subband-specific RRS signal transmissions in a network such as the networks 100 and 200. In the scenario 1300, a BS A serves a UE A, while a BS B serves a UE B, where the BS A, the BS B, the UE A, and the UE B are operated by the same operator. In a particular TXOP (e.g., the TXOP 302), the default link priority may be DL and a shared spectrum may be divided into subbands. The BS A may reserve the TXOP for a DL communication with the UE A as shown by the arrow 1310, while the BS B may reserve the TXOP for UL communication with the UE B as shown by the arrow 1320. Thus, the BS A and the UE A may have priority over the BS B and the UE B.

Depending on the traffic load, a DL communication and/or a UL communication may require only a portion of a system bandwidth during certain time periods. For example, the BS A may transmit an RRQ signal indicating a DL trigger in two subbands. The UE A may respond to the reservation by transmitting an RRS signal (e.g., the RRS signal 322, 324, and 602) in each scheduled subband or transmitting an RRS signal indicating the medium reservation with the two scheduled subbands. The UE B may detect the RRS signals from the UE A as shown by the arrow 1330. The UE B may observe that the reservation is for the two subbands. The UE B may transmit UL data to the BS B using other unreserved subbands, as described in greater detail herein.

FIG. 14 illustrates a subband-specific RRS signal transmission scheme 1400 according to embodiments of the present disclosure. The scheme 1400 is described in the context of the scenario 1300. In the scheme 1400, the shared spectrum 301 can be divided into a number of subbands 1410. As an example, the shared spectrum 301 may have 100 resource blocks (RBs) and may be semi-statically divided into 5 subbands 1410, each including about 20 RBs. For example, the BS A may schedule the UE A for DL communication in the subbands $1410_{S1}$ and $1410_{S2}$. The UE A may respond by transmitting an RRS signal $1420_{S1}$ in the scheduled subband $1410_{S1}$ and an RRS signal $1420_{S2}$ in the scheduled subband $1410_{S2}$, for example, during a portion 309 of a corresponding CCA period 304. Alternatively, the UE A may respond by transmitting RRS signals indicating the medium reservation with the subbands $1410_{S1}$ and $1420_{S2}$ during the portion 309. The RRS signals 1420 may be similar to the RRS signals 322, 324, and/or 602. Subsequently, the BS A may transmit DL data 1422 to the UE A during a transmission period 306 of the TXOP 302 over the scheduled subbands $1410_{S1}$ and $1410_{S2}$.

The BS B may schedule the UE B for UL communication in four subbands $1410_{S1}$, $1410_{S3}$, $1410_{S4}$, and $1410_{S5}$. The UE B may monitor each subband 1410 for an RRS signal 1420 or monitor for RRS signals associated with each subband during the portion 309. The UE B may detect the RRS signals $1420_{S1}$ and $1420_{S2}$ from the UE A in the subbands $1410_{S1}$ and $1410_{S2}$, respectively. Alternatively, the UE B may detect the RRS signals associated with the subbands $1410_{S1}$ and $1410_{S2}$. Thus, the UE B may refrain from transmitting in the reserved subband $1410_{S1}$. However, the UE B may transmit UL data 1430 to the BS B over the subbands $1410_{S3}$, $1410_{S4}$, and $1410_{S5}$ during the transmission period 306. As shown, the UE B can use the unreserved subbands $1410_{S3}$, $1410_{S4}$, and $1410_{S5}$ that may otherwise be underutilized. Thus, the subband-specific RRS signal transmissions can improve resource utilization efficiency. While the scheme 1400 is illustrated in the context of link-level sharing within an operator, the scheme 1400 can be applied to operator-level sharing across operators.

Figure 15:
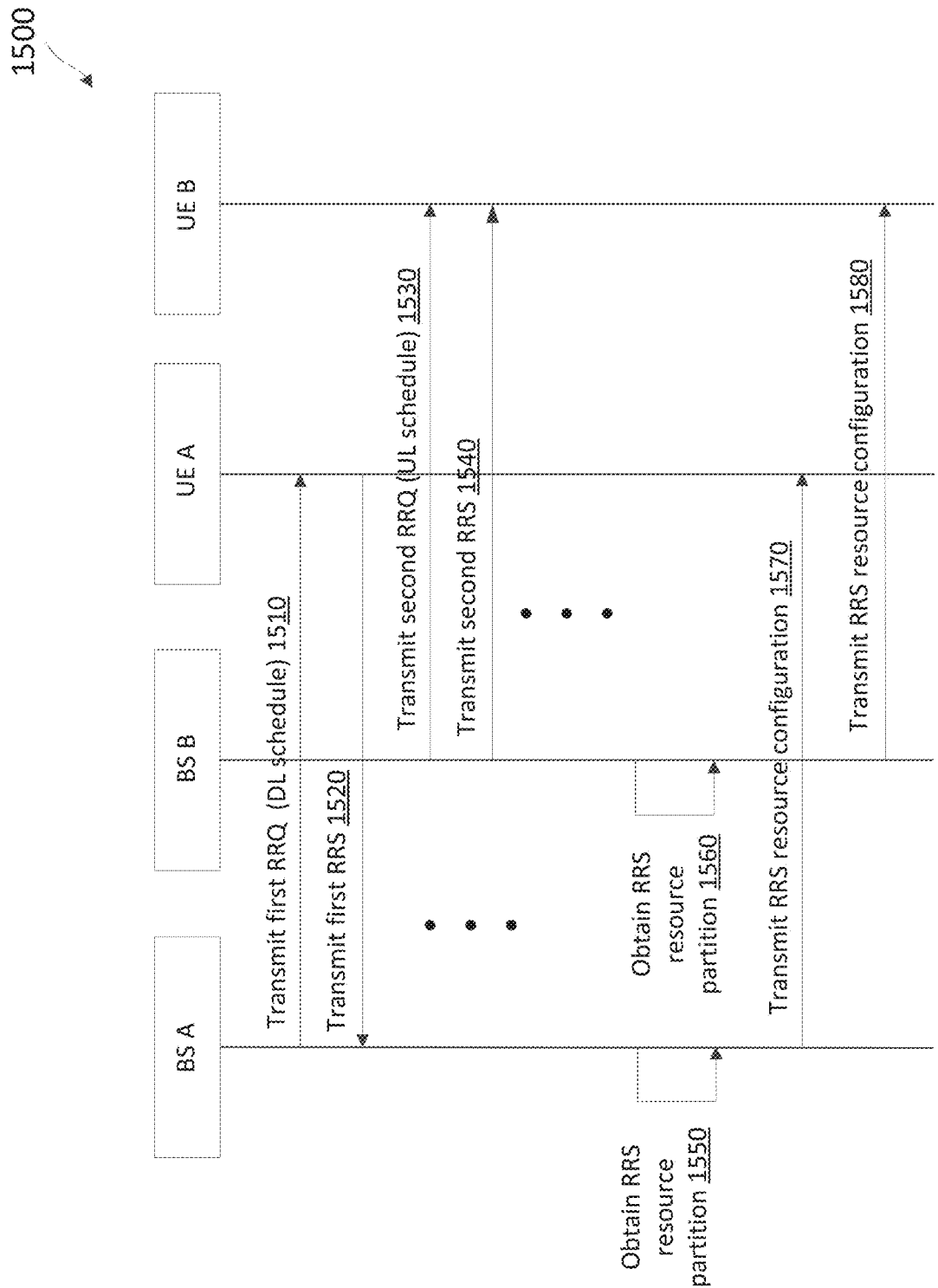
FIG. 15 is a signaling diagram illustrating an RRS resource partitioning method according to embodiments of the present disclosure.

FIG. 15 is a signaling diagram illustrating an RRS resource partitioning method 1500 according to embodiments of the present disclosure. Steps of the method 1500 can be executed by a computing device (e.g., a processor, processing circuit, and/or other suitable component) of a wireless communication device, such as the BSs 105, 205, and 500 and the UEs 115, 215, and 400. The method 1500 may be used in conjunction with the schemes 300, 600, 700, 1100, and/or 1400 and the methods 800, 900, and/or 1200 in a network such as the networks 100 and 200. As illustrated, the method 1500 includes a number of enumerated steps, but embodiments of the method 1500 may include additional steps before, after, and in between the enumerated steps. In some embodiments, one or more of the enumerated steps may be omitted or performed in a different order.

In the method 1500, a BS A serves a UE A, while a BS B serves a UE B, where the BS A, the BS B, the UE A, and the UE B are operated by the same operator. At step 1510, the BS A transmits a first RRQ signal (e.g., the RRQ signal 320) including a DL schedule for the UE A. At step 1520, the UE A (e.g., the target receiver) transmits a first RRS signal (e.g., the RRS signals 322, 324, and 602) to silence low priority nodes near the UE A.

At step 1530, the BS B transmits a second RRQ signal including a UL schedule for the UE B. At step 1540, the BS B (e.g., the target receiver) transmits a second RRS signal to silence low priority nodes around the BS B. The first RRQ signal and the second RRQ signal can be transmitted in the same time period using reuse one. The first RRS signal and the second RRS signal can be transmitted via TDM or FDM depending on channel conditions. For example, the steps 1510 to 1540 may repeat and may include subsequent data communications based on reservation signal monitoring at the BS A, the BS B, the UE A, and/or the UE B.

The BS A and the BS B may collect signal measurements in the network based on the reservation signals or other signals communicated among the BS A, the BS B, the UE A, and the UE B. The BS A and the BS B may determine a jamming graph or interference relationships among the nodes in the network based on the measurements. The BS A and the BS B may further provide the measurements and/or jamming graph to a central entity (e.g., the SAS). The central entity may determine a resource partition for RRS signal transmissions between different links.

For example, a monitoring node may be close to the BS B and further away from the UE A. Thus, the monitoring node may receive the second RRS signal with a strong signal power and receive the first RRS signal with a weak signal power. Depending on the hardware design (e.g., the analog-to-digital converter (ADC) dynamic range) of the monitoring node, the strong signal power of the second RRS signal can consume a significant number of ADC-bits within the ADC dynamic range, leaving an insufficient number of ADC-bits for the detection of the first RRS signal. Thus, the monitoring node may miss the detection of the first RRS signal. The signal measurements and/or jamming graph may detect and/or indicate the signal powers of the first RRS signal and the second RRS signal and/or the missed detection. As such, the central entity can partition or allocate RRS resources such that UL and DL RRS signal transmissions are on TDM resources (e.g., in different time periods) instead of FDM resources (e.g., in the same time period). Conversely, when the second RRS signal from the BS B does not overpower or desensitize the first RRS signal from the UE A, the central entity can configure UL and DL RRS transmissions on difference frequency resources within the same time period.

At step 1550, the BS A may obtain RRS resource partition information, for example, from the central entity. At step 1560, the BS B may obtain RRS resource partition information, for example, from the central entity.

At step 1570, the BS A may transmit an RRS resource configuration to the UE A based on the RRS resource partition information. The RRS resource configuration may include TDM and/or FDM resources for UL RRS transmissions and DL RRS transmissions. Similarly, at step 1580, the BS B may transmit an RRS resource configuration to the UE A based on the RRS resource partition information. Subsequently, the BS A, the BS B, the UE A, and the UE B may transmit RRS signals and/or monitor for RRS signals based on the RRS resource configuration. The re-partitioning or reconfiguration of RRS resources can occur over a slow time scale, and thus the RRS resource partition can be semi-statically configured.

Figure 16:
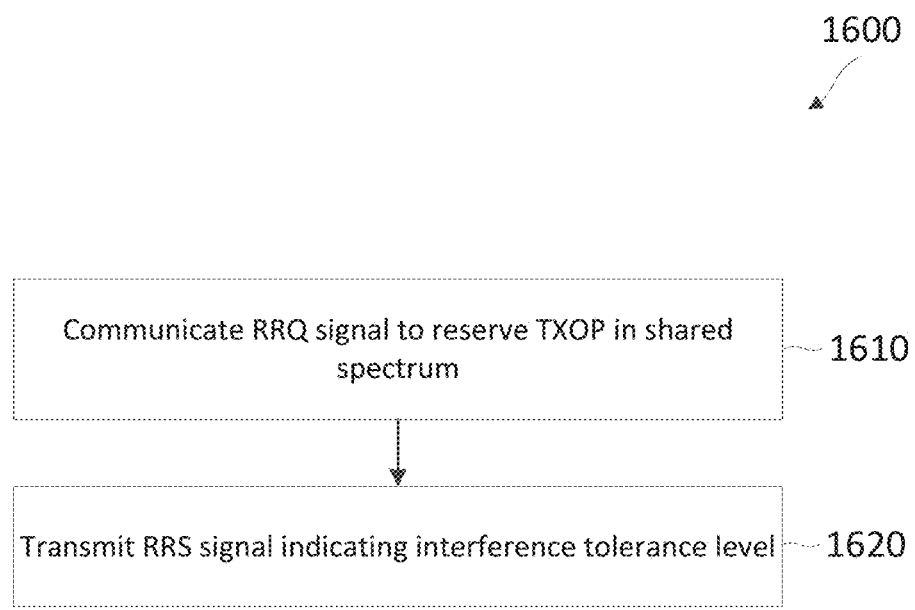
FIG. 16 is a flow diagram of a spectrum sharing method with an interference tolerance level indication according to embodiments of the present disclosure.

FIG. 16 is a flow diagram of a spectrum sharing method 1600 with an interference tolerance level indication according to embodiments of the present disclosure. Steps of the method 1600 can be executed by a computing device (e.g., a processor, processing circuit, and/or other suitable component) of a wireless communication device, such as the BSs 105, 205, and 500 and the UEs 115, 215, and 400. The method 1600 may employ similar mechanisms as in the schemes 300, 600, and 700 and the methods 800 and 900 described with respect to FIGS. 3, 6, 7, 8 and 9, respectively. As illustrated, the method 1600 includes a number of enumerated steps, but embodiments of the method 1600 may include additional steps before, after, and in between the enumerated steps. In some embodiments, one or more of the enumerated steps may be omitted or performed in a different order.

At step 1610, the method 1600 includes communicating an RRQ signal (e.g., the RRQ signal 320) to reserve a TXOP (e.g., the TXOP 302) in a shared spectrum (e.g., the shared spectrum 301). The shared spectrum is shared by the plurality of network operating entities (e.g., Operator A and Operator B) based on priorities. For example, the wireless communication device (e.g., the BS 205a or the UE 215a) is associated with a first network operating entity (e.g., Operator A) of the plurality of the network operating entities.

At step 1620, the method 1600 includes transmitting an RRS signal (e.g., the RRS signals 322, 324, and 602) indicating an interference tolerance level (e.g., the interference tolerance level 612) of the wireless communication device. In an embodiment, the RRS signal can include a predetermined sequence and a message indicating the interference tolerance level as described in the scheme 600. The predetermined sequence can be transmitted on a common resource. The message can be transmitted on a receiver-specific resource. In another embodiment, the RRS signal can include a sequence that has a correspondence to the interference tolerance level. In another embodiment, the RRS signal can be transmitted at a transmit signal power level based on the interference tolerance level as described in the scheme 700. The interference tolerance level can be determined using the methods 800 or 900.

Figure 17:
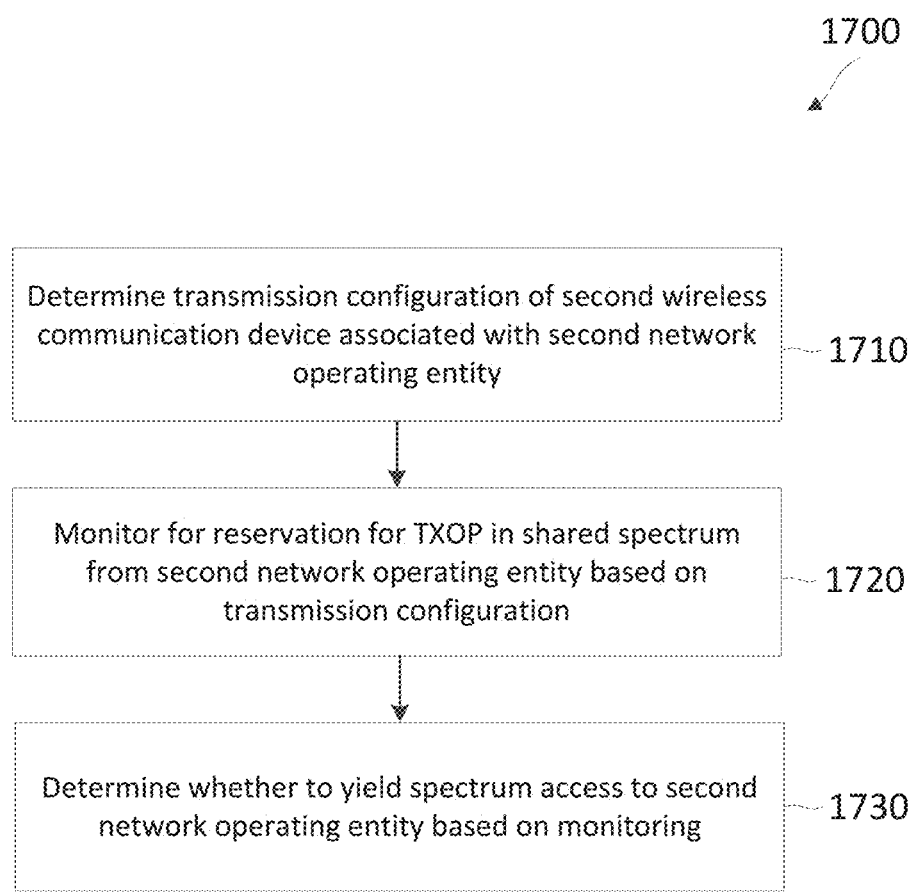
FIG. 17 is a flow diagram of a spectrum sharing method with an RRS transmission configuration consideration according to embodiments of the present disclosure.

FIG. 17 is a flow diagram of a spectrum sharing method 1700 with an RRS transmission configuration consideration according to embodiments of the present disclosure. Steps of the method 1700 can be executed by a computing device (e.g., a processor, processing circuit, and/or other suitable component) of a wireless communication device, such as the BSs 105, 205, and 500 and the UEs 115, 215, and 400. The method 1700 may employ similar mechanisms as in the schemes 1100 described with respect to FIG. 11, respectively. As illustrated, the method 1700 includes a number of enumerated steps, but embodiments of the method 1700 may include additional steps before, after, and in between the enumerated steps. In some embodiments, one or more of the enumerated steps may be omitted or performed in a different order.

At step 1710, the method 1700 includes determining a transmission configuration of a second wireless communication device associated with a second network operating entity (e.g., Operator A). The wireless communication device may be associated with a first network operating entity (e.g., Operator B). The first network operating entity and the second network operating entity may coordinate access to a shared spectrum (e.g., the shared spectrum 301) as described in the scheme 300. The transmission configuration may include a timing offset value, a CP length, a symbol duration, and/or a subcarrier spacing as described above with respect to the scenario 1000 and the scheme 1100.

At step 1720, the method 1700 includes monitoring for a reservation (e.g., the RRS signals 322, 324, and 602) for a TXOP (e.g., the TXOP 302) in the shared spectrum from the second network operating entity based on the transmission configuration.

At step 1730, the method 1700 includes determining whether to yield spectrum access to the second network operating entity based on the monitoring.

Figure 18:
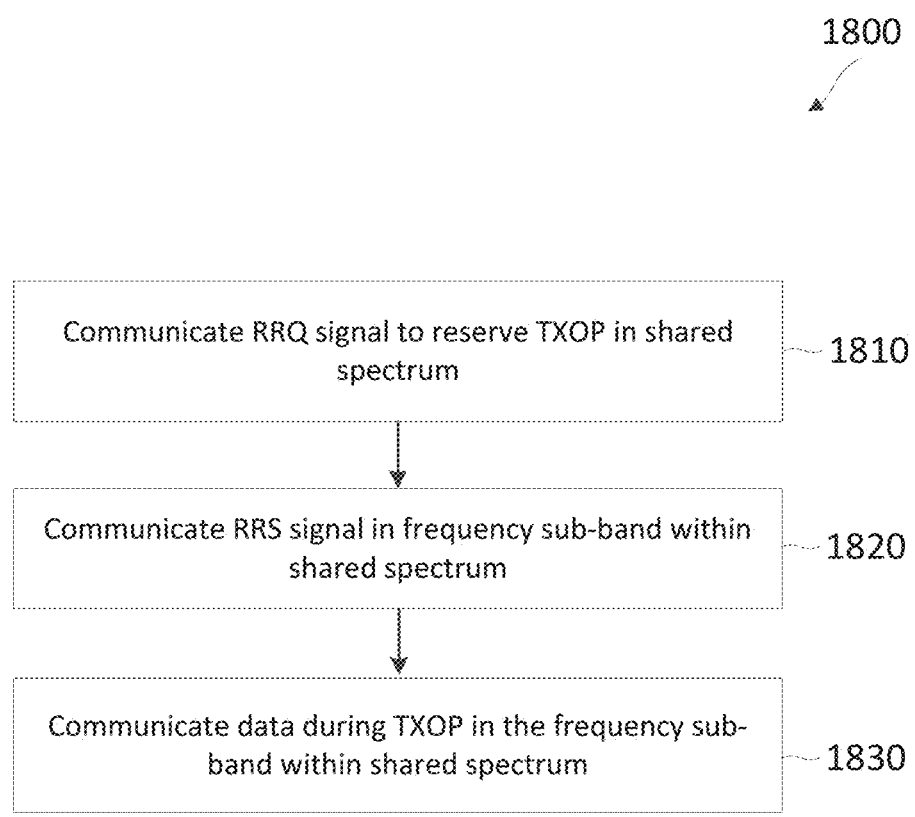
FIG. 18 is a flow diagram of a spectrum sharing method with a subband-specific RRS signal transmission according to embodiments of the present disclosure.

FIG. 18 is a flow diagram of a spectrum sharing method 1800 with a subband-specific RRS signal transmission according to embodiments of the present disclosure. Steps of the method 1800 can be executed by a computing device (e.g., a processor, processing circuit, and/or other suitable component) of a wireless communication device, such as the BSs 105, 205, and 500 and the UEs 115, 215, and 400. The method 1800 may employ similar mechanisms as in the scheme 1400 described with respect to FIG. 14. As illustrated, the method 1800 includes a number of enumerated steps, but embodiments of the method 1800 may include additional steps before, after, and in between the enumerated steps. In some embodiments, one or more of the enumerated steps may be omitted or performed in a different order.

At step 1810, the method 1800 includes communicating an RRQ signal (e.g., the RRQ signal 320) with a second wireless communication device to reserve a TXOP (e.g., the TXOP 302) in a shared spectrum (e.g., the shared spectrum 301). The shared spectrum is shared by the plurality of network operating entities (e.g., Operator A and Operator B) based on priorities. For example, the wireless communication device (e.g., the BS 205a or the UE 215a) and the second wireless communication device are associated with a first network operating entity (e.g., Operator A) of the plurality of the network operating entities.

At step 1820, the method 1800 includes communication an RRS signal (e.g., the RRS signals 322, 324, and 602) with the second wireless communication device in a frequency subband (e.g., the subbands 1410) within the shared spectrum. For example, the RRQ signal includes a transmission schedule for the frequency subband.

At step 1830, the method 1800 includes communicating data (e.g., the data 326) with the second wireless communication device during the TXOP in the frequency subband within the shared spectrum.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure further include a method of wireless communication, comprising communicating, by a first wireless communication device with a second wireless communication device, a reservation request (RRQ) signal to reserve a transmission opportunity (TXOP) in a shared spectrum, wherein the shared spectrum is shared by a plurality of network operating entities, and wherein the first wireless communication device and the second wireless communication device are associated with a first network operating entity of the plurality of network operating entities; and transmitting, by the first wireless communication device, a reservation response (RRS) signal indicating an interference tolerance level of the first wireless communication device.

The method further includes wherein the RRS signal includes a predetermined sequence and a message including the interference tolerance level, and wherein the transmitting includes transmitting the predetermined sequence using a first resource; and transmitting the message using a second resource different from the first resource. The method further includes wherein the transmitting includes transmitting a predetermined sequence that has a correspondence to the interference tolerance level. The method further includes setting, by the first wireless communication device, a transmit signal power level for the RRS signal based on the interference tolerance level. The method further includes determining, by the first wireless communication device, the interference tolerance level based on a transmit power of the first wireless communication device. The method further includes determining, by the first wireless communication device, the interference tolerance level based on a transmit power of the second wireless communication device. The method further includes wherein the communicating includes receiving, by the first wireless communication device from the second wireless communication device, the RRQ signal indicating the transmit power of the second wireless communication device. The method further includes receiving, by the first wireless communication device from the second wireless communication device, downlink (DL) data during the TXOP in the shared spectrum. The method further includes wherein the communicating includes transmitting, by the first wireless communication device to the second wireless communication device, the RRQ signal, and wherein the method further comprises determining, by the first wireless communication device, the interference tolerance level based on a receive power from one or more third wireless communication devices associated with the first network operating entity; and receiving, by the first wireless communication device from the second wireless communication device, uplink (UL) data during the TXOP in the shared spectrum. The method further includes detecting, by the first wireless communication device from a third wireless communication device associated with a second network operating entity of the plurality of network operating entities, an RRS signal reserving another TXOP in the shared spectrum and indicating an interference tolerance level of the third wireless communication device; and yielding, by the first wireless communication device, access to the shared spectrum during the another TXOP based on the interference tolerance level of the third wireless communication device. The method further includes detecting, by the first wireless communication device from a third wireless communication device associated with a second network operating entity of the plurality of network operating entities, an RRS signal reserving another TXOP in the shared spectrum and indicating an interference tolerance level of the third wireless communication device; and communicating, by the first wireless communication device with a fourth wireless communication device, data during the another TXOP in the shared spectrum based on the interference tolerance level of the third wireless communication device. The method further includes wherein the transmitting further includes transmitting a sounding reference signal (SRS). The method further includes wherein the SRS is associated with a serving cell of the first wireless communication device and the second wireless communication device. The method further includes wherein the communicating includes receiving, by the first wireless communication device from the second wireless communication device, the RRQ signal indicating at least one of SRS resource information or SRS sequence information, and wherein the transmitting the SRS is based on the at least one of SRS resource information or SRS sequence information. The method further includes wherein the communicating includes transmitting, by the first wireless communication device to the second wireless communication device, the RRQ signal indicating at least one of SRS resource information or SRS sequence information, and wherein the transmitting the SRS is based on the at least one of SRS resource information or SRS sequence information. The method further includes wherein the TXOP includes a first resource and a second resource, wherein the first resource is designated to the first network operating entity for an RRS signal transmission associated with a first link direction, wherein the second resource is designated to the first network operating entity for an RRS signal transmission associated with a second link direction, wherein the first link direction and the second link direction are different, wherein the RRQ signal reserves the TXOP for communication in the first link direction, and wherein the RRS signal is transmitted using the first resource. The method further includes wherein the first resource and the second resource are in different periods within the TXOP. The method further includes wherein the first resource and the second resource occupy different portions of the shared spectrum in a same period within the TXOP. The method further includes receiving, by the first wireless communication device, an RRS resource configuration based on signal measurements associated with the first wireless communication device and the second wireless communication device, and wherein the RRS resource configuration indicates the first resource and the second resource.

Embodiments of the present disclosure further include a method of wireless communication, comprising determining, by a first wireless communication device associated with a first network operating entity, a transmission configuration of a second wireless communication device associated with a second network operating entity; and monitoring, by the first wireless communication device, for a reservation for a transmission opportunity (TXOP) in a shared spectrum from the second network operating entity based on the transmission configuration, wherein the shared spectrum is shared by the first network operating entity and the second network operating entity.

The method further includes wherein the transmission configuration includes at least one of a timing advance (TA) value, a cyclic-prefix (CP) length, a symbol duration, or a subcarrier spacing. The method further includes refraining, by the first wireless communication device, from transmitting in the shared spectrum during the TXOP based on the monitoring. The method further includes communicating, by the first wireless communication device with a third wireless communication device, a reservation request (RRQ) signal to reserve the TXOP in the shared spectrum, wherein the third wireless communication device is associated with the first network operating entity; and transmitting, by the first wireless communication device in response to the RRQ signal, a reservation response (RRS) signal based on the monitoring.

Embodiments of the present disclosure further include a method of wireless communication, comprising communicating, by a first wireless communication device with a second wireless communication device, a reservation request (RRQ) signal to reserve a transmission opportunity (TXOP) in a shared spectrum, wherein the shared spectrum is shared by a plurality of network operating entities, and wherein the first wireless communication device and the second wireless communication device are associated with a first network operating entity of the plurality of network operating entities; communicating, by the first wireless communication device, a reservation response (RRS) signal in a frequency subband within shared spectrum; and communicating, by the first wireless communication device with the second wireless communication device, data during the TXOP in the frequency subband within the shared spectrum.

The method further includes wherein the communicating the RRQ signal includes transmitting, by the first wireless communication device to the second wireless communication device, the RRQ signal indicating a transmission schedule for the TXOP in the frequency subband within the shared spectrum. The method further includes wherein the communicating the RRQ signal includes receiving, by the first wireless communication device from the second wireless communication device, the RRQ signal indicating a transmission schedule for the TXOP in the frequency subband within the shared spectrum. The method further includes wherein the communicating the RRS signal includes transmitting, by the first wireless communication device to the second wireless communication device, the RRS signal in the frequency subband within the shared spectrum. The method further includes wherein the communicating the RRS signal includes receiving, by the first wireless communication device from the second wireless communication device, the RRS signal in the frequency subband within the shared spectrum. The method further includes detecting, by the first wireless communication device, another RRS signal for the TXOP from a second network operating entity of the plurality of network operating entities, wherein the another RRS signal indicates another frequency subband within the shared spectrum. The method further includes wherein the communicating the RRS signal in the frequency subband is based on the detecting.

Embodiments of the present disclosure further include an apparatus comprising a processor configured to communicate, with a second wireless communication device, a reservation request (RRQ) signal to reserve a transmission opportunity (TXOP) in a shared spectrum, wherein the shared spectrum is shared by a plurality of network operating entities, and wherein the apparatus and the second wireless communication device are associated with a first network operating entity of the plurality of network operating entities; and a transceiver configured to transmit a reservation response (RRS) signal indicating an interference tolerance level of the apparatus.

The apparatus further includes wherein the RRS signal includes a predetermined sequence and a message including the interference tolerance level, and wherein the transceiver is further configured to transmit the RRS signal by transmitting the predetermined sequence using a first resource; and transmitting the message using a second resource different from the first resource. The apparatus further includes wherein the transceiver is further configured to transmit the RRS signal by transmitting a predetermined sequence that has a correspondence to the interference tolerance level. The apparatus further includes wherein the processor is further configured to set a transmit signal power level for the RRS signal based on the interference tolerance level. The apparatus further includes wherein the processor is further configured to determine the interference tolerance level based on a transmit power of the apparatus. The apparatus further includes wherein the processor is further configured to determine the interference tolerance level based on a transmit power of the second wireless communication device. The apparatus further includes wherein the transceiver is further configured to communicating RRQ signal by receiving, from the second wireless communication device, the RRQ signal indicating the transmit power of the second wireless communication device. The apparatus further includes wherein the transceiver is further configured to receive, from the second wireless communication device, downlink (DL) data during the TXOP in the shared spectrum. The apparatus further includes wherein the transceiver is further configured to communicate the RRQ signal by transmitting, to the second wireless communication device, the RRQ signal; and receive, from the second wireless communication device, uplink (UL) data during the TXOP in the shared spectrum, and wherein the processor is further configured to determine the interference tolerance level based on a receive power from one or more third wireless communication devices associated with the first network operating entity. The apparatus further includes wherein the processor is further configured to detect, from a third wireless communication device associated with a second network operating entity of the plurality of network operating entities, an RRS signal reserving another TXOP in the shared spectrum and indicating an interference tolerance level of the third wireless communication device; and yield access to the shared spectrum during the another TXOP based on the interference tolerance level of the third wireless communication device. The apparatus further includes wherein the processor is further configured to detect, from a third wireless communication device associated with a second network operating entity of the plurality of network operating entities, an RRS signal reserving another TXOP in the shared spectrum and indicating an interference tolerance level of the third wireless communication device, and wherein the transceiver is further configured to communicate, with a fourth wireless communication device, data during the another TXOP in the shared spectrum based on the interference tolerance level of the third wireless communication device. The apparatus further includes wherein the transceiver is further configured to transmit the RRS signal by transmitting a sounding reference signal (SRS). The apparatus further includes wherein the SRS is associated with a serving cell of the apparatus and the second wireless communication device. The apparatus further includes wherein the transceiver is further configured to communicate the RRQ signal by receiving, from the second wireless communication device, the RRQ signal indicating at least one of SRS resource information or SRS sequence information; and transmit the SRS based on the at least one of SRS resource information or SRS sequence information. The apparatus further includes wherein the transceiver is further configured to communicate the RRQ signal by transmitting, to the second wireless communication device, the RRQ signal indicating at least one of SRS resource information or SRS sequence information, and wherein the transmitting the SRS is based on the at least one of SRS resource information or SRS sequence information. The apparatus further includes wherein the TXOP includes a first resource and a second resource, wherein the first resource is designated to the first network operating entity for an RRS signal transmission associated with a first link direction, wherein the second resource is designated to the first network operating entity for an RRS signal transmission associated with a second link direction, wherein the first link direction and the second link direction are different, wherein the RRQ signal reserves the TXOP for communication in the first link direction, and wherein the RRS signal is transmitted using the first resource. The apparatus further includes wherein the first resource and the second resource are in different periods within the TXOP. The apparatus further includes wherein the first resource and the second resource occupy different portions of the shared spectrum in a same period within the TXOP. The apparatus further includes wherein the transceiver is further configured to receive an RRS resource configuration based on signal measurements associated with the apparatus and the second wireless communication device, and wherein the RRS resource configuration indicates the first resource and the second resource.

Embodiments of the present disclosure further include an apparatus comprising a processor configured to determine a transmission configuration of a second wireless communication device associated with a second network operating entity, wherein the apparatus is associated with a first network operating entity; and monitor for a reservation for a transmission opportunity (TXOP) in a shared spectrum from the second network operating entity based on the transmission configuration, wherein the shared spectrum is shared by the first network operating entity and the second network operating entity.

The apparatus further includes wherein the transmission configuration includes at least one of a timing advance (TA) value, a cyclic-prefix (CP) length, a symbol duration, or a subcarrier spacing. The apparatus further includes wherein the processor is further configured to refrain from transmitting in the shared spectrum during the TXOP based on the monitoring. The apparatus further includes a transceiver configured to communicate with a third wireless communication device, a reservation request (RRQ) signal to reserve the TXOP in the shared spectrum, wherein the third wireless communication device is associated with the first network operating entity; and transmit, in response to the RRQ signal, a reservation response (RRS) signal based on the monitoring.

Embodiments of the present disclosure further include an apparatus comprising a transceiver configured to communicate with a second wireless communication device, a reservation request (RRQ) signal to reserve a transmission opportunity (TXOP) in a shared spectrum, wherein the shared spectrum is shared by a plurality of network operating entities, and wherein the apparatus and the second wireless communication device are associated with a first network operating entity of the plurality of network operating entities; communicate a reservation response (RRS) signal in a frequency subband within shared spectrum; and communicate with the second wireless communication device, data during the TXOP in the frequency subband within the shared spectrum.

The apparatus further includes wherein the transceiver is further configured to communicate the RRQ signal by transmitting, to the second wireless communication device, the RRQ signal indicating a transmission schedule for the TXOP in the frequency subband within the shared spectrum. The apparatus further includes wherein the transceiver is further configured to communicate the RRQ signal by receiving, from the second wireless communication device, the RRQ signal indicating a transmission schedule for the TXOP in the frequency subband within the shared spectrum. The apparatus further includes wherein the transceiver is further configured to communicate the RRS signal by transmitting, to the second wireless communication device, the RRS signal in the frequency subband within the shared spectrum. The apparatus further includes wherein the transceiver is further configured to communicate the RRS signal by receiving, from the second wireless communication device, the RRS signal in the frequency subband within the shared spectrum. The apparatus further includes a processor configured to detect another RRS signal for the TXOP from a second network operating entity of the plurality of network operating entities, wherein the another RRS signal indicates another frequency subband within the shared spectrum. The apparatus further includes wherein the transceiver is further configured to communicate the RRS signal in the frequency subband based on the another RRS signal detected.

Embodiments of the present disclosure further include a computer-readable medium having program code recorded thereon, the program code comprising code for causing a first wireless communication device to communicate, with a second wireless communication device, a reservation request (RRQ) signal to reserve a transmission opportunity (TXOP) in a shared spectrum, wherein the shared spectrum is shared by a plurality of network operating entities, and wherein the first wireless communication device and the second wireless communication device are associated with a first network operating entity of the plurality of network operating entities; and code for causing the first wireless communication device to transmit a reservation response (RRS) signal indicating an interference tolerance level of the first wireless communication device.

The computer-readable medium further includes wherein the RRS signal includes a predetermined sequence and a message including the interference tolerance level, and wherein the code for causing the first wireless communication device to transmit the RRS signal is further configured to transmit the predetermined sequence using a first resource; and transmit the message using a second resource different from the first resource. The computer-readable medium further includes wherein the code for causing the first wireless communication device to transmit the RRS signal is further configured to transmit a predetermined sequence that has a correspondence to the interference tolerance level. The computer-readable medium further includes code for causing the first wireless communication device to set a transmit signal power level for the RRS signal based on the interference tolerance level. The computer-readable medium further includes code for causing the first wireless communication device to determine the interference tolerance level based on a transmit power of the first wireless communication device. The computer-readable medium further includes code for causing the first wireless communication device to determine the interference tolerance level based on a transmit power of the second wireless communication device. The computer-readable medium further includes wherein the code for causing the first wireless communication device to communicate the RRQ signal is further configured to receive, from the second wireless communication device, the RRQ signal indicating the transmit power of the second wireless communication device. The computer-readable medium further includes code for causing the first wireless communication device to receive, from the second wireless communication device, downlink (DL) data during the TXOP in the shared spectrum. The computer-readable medium further includes wherein the code for causing the first wireless communication device to communicate the RRQ signal is further configured to transmit, to the second wireless communication device, the RRQ signal, and wherein the computer-readable medium further comprises code for causing the first wireless communication device to determine the interference tolerance level based on a receive power from one or more third wireless communication devices associated with the first network operating entity; and code for causing the first wireless communication device to receive, from the second wireless communication device, uplink (UL) data during the TXOP in the shared spectrum. The computer-readable medium further includes code for causing the first wireless communication device to detect, from a third wireless communication device associated with a second network operating entity of the plurality of network operating entities, an RRS signal reserving another TXOP in the shared spectrum and indicating an interference tolerance level of the third wireless communication device; and code for causing the first wireless communication device to yield access to the shared spectrum during the another TXOP based on the interference tolerance level of the third wireless communication device. The computer-readable medium further includes code for causing the first wireless communication device to detect, from a third wireless communication device associated with a second network operating entity of the plurality of network operating entities, an RRS signal reserving another TXOP in the shared spectrum and indicating an interference tolerance level of the third wireless communication device; and code for causing the first wireless communication device to communicate, with a fourth wireless communication device, data during the another TXOP in the shared spectrum based on the interference tolerance level of the third wireless communication device. The computer-readable medium further includes wherein the code for causing the first wireless communication device to transmit the RRS signal is further configured to transmit a sounding reference signal (SRS). The computer-readable medium further includes wherein the SRS is associated with a serving cell of the first wireless communication device and the second wireless communication device. The computer-readable medium further includes wherein the code for causing the first wireless communication device to communicate the RRQ signal is further configured to receive, from the second wireless communication device, the RRQ signal indicating at least one of SRS resource information or SRS sequence information, and wherein the code for causing the first wireless communication device to transmit the SRS is further configured to transmit the SRS based on the at least one of SRS resource information or SRS sequence information. The computer-readable medium further includes wherein the code for causing the first wireless communication device to communicate the RRQ signal is further configured to transmit, to the second wireless communication device, the RRQ signal indicating at least one of SRS resource information or SRS sequence information, and wherein the code for causing the first wireless communication device to transmit the SRS is further configured to transmit the SRS based on the at least one of SRS resource information or SRS sequence information. The computer-readable medium further includes wherein the TXOP includes a first resource and a second resource, wherein the first resource is designated to the first network operating entity for an RRS signal transmission associated with a first link direction, wherein the second resource is designated to the first network operating entity for an RRS signal transmission associated with a second link direction, wherein the first link direction and the second link direction are different, wherein the RRQ signal reserves the TXOP for communication in the first link direction, and wherein the RRS signal is transmitted using the first resource. The computer-readable medium further includes wherein the first resource and the second resource are in different periods within the TXOP. The computer-readable medium further includes wherein the first resource and the second resource occupy different portions of the shared spectrum in a same period within the TXOP. The computer-readable medium further includes code for causing the first wireless communication device to receive an RRS resource configuration based on signal measurements associated with the first wireless communication device and the second wireless communication device, and wherein the RRS resource configuration indicates the first resource and the second resource.

Embodiments of the present disclosure further include a computer-readable medium of wireless communication, comprising code for causing a first wireless communication device to determine a transmission configuration of a second wireless communication device associated with a second network operating entity, wherein the first wireless communication device is associated with a first network operating entity; and code for causing the first wireless communication device to monitor for a reservation for a transmission opportunity (TXOP) in a shared spectrum from the second network operating entity based on the transmission configuration, wherein the shared spectrum is shared by the first network operating entity and the second network operating entity.

The computer-readable medium further includes wherein the transmission configuration includes at least one of a timing advance (TA) value, a cyclic-prefix (CP) length, a symbol duration, or a subcarrier spacing. The computer-readable medium further includes code for causing the first wireless communication device to refrain from transmitting in the shared spectrum during the TXOP based on the monitoring. The computer-readable medium further includes code for causing the first wireless communication device to communicate, with a third wireless communication device, a reservation request (RRQ) signal to reserve the TXOP in the shared spectrum, wherein the third wireless communication device is associated with the first network operating entity; and code for causing the first wireless communication device to transmit, in response to the RRQ signal, a reservation response (RRS) signal based on the monitoring.

Embodiments of the present disclosure further include a computer-readable medium of wireless communication, comprising code for causing a first wireless communication device to communicate, with a second wireless communication device, a reservation request (RRQ) signal to reserve a transmission opportunity (TXOP) in a shared spectrum, wherein the shared spectrum is shared by a plurality of network operating entities, and wherein the first wireless communication device and the second wireless communication device are associated with a first network operating entity of the plurality of network operating entities; code for causing the first wireless communication device to communicate a reservation response (RRS) signal in a frequency subband within shared spectrum; and code for causing the first wireless communication device to communicate, with the second wireless communication device, data during the TXOP in the frequency subband within the shared spectrum. The computer-readable medium further includes wherein the code for causing the first wireless communication device to communicate the RRQ signal is further configured to transmit, to the second wireless communication device, the RRQ signal indicating a transmission schedule for the TXOP in the frequency subband within the shared spectrum. The computer-readable medium further includes wherein the code for causing the first wireless communication device to communicate the RRQ signal is further configured to receive, from the second wireless communication device, the RRQ signal indicating a transmission schedule for the TXOP in the frequency subband within the shared spectrum. The computer-readable medium further includes wherein the code for causing the first wireless communication device to communicate the RRS signal is further configured to transmit, to the second wireless communication device, the RRS signal in the frequency subband within the shared spectrum. The computer-readable medium further includes wherein the code for causing the first wireless communication device to communicate the RRS signal is further configured to receive, from the second wireless communication device, the RRS signal in the frequency subband within the shared spectrum. The computer-readable medium further includes code for causing the first wireless communication device to detect another RRS signal for the TXOP from a second network operating entity of the plurality of network operating entities, wherein the another RRS signal indicates another frequency subband within the shared spectrum. The computer-readable medium further includes wherein the code for causing the first wireless communication device to communicate the RRS signal is further configured to communicate the RRS signal in the frequency subband based on the another RRS signal detected.

Embodiments of the present disclosure further include an apparatus comprising means for communicating, with a second wireless communication device, a reservation request (RRQ) signal to reserve a transmission opportunity (TXOP) in a shared spectrum, wherein the shared spectrum is shared by a plurality of network operating entities, and wherein the apparatus and the second wireless communication device are associated with a first network operating entity of the plurality of network operating entities; and means for transmitting a reservation response (RRS) signal indicating an interference tolerance level of the apparatus.

The apparatus further includes wherein the RRS signal includes a predetermined sequence and a message including the interference tolerance level, and wherein the means for transmitting the RRS signal is further configured to transmit the predetermined sequence using a first resource; and transmit the message using a second resource different from the first resource. The apparatus further includes wherein the means for transmitting the RRS signal is further configured to transmit a predetermined sequence that has a correspondence to the interference tolerance level. The apparatus further includes means for setting a transmit signal power level for the RRS signal based on the interference tolerance level. The apparatus further includes means for determining the interference tolerance level based on a transmit power of the apparatus. The apparatus further includes means for determining the interference tolerance level based on a transmit power of the second wireless communication device. The apparatus further includes wherein the means for communicating the RRQ signal is further configured to receive, from the second wireless communication device, the RRQ signal indicating the transmit power of the second wireless communication device. The apparatus further includes means for receiving, from the second wireless communication device, downlink (DL) data during the TXOP in the shared spectrum. The apparatus further includes wherein the means for communicate the RRQ signal is further configured to transmit, to the second wireless communication device, the RRQ signal, and wherein the apparatus further comprises means for receiving, from the second wireless communication device, uplink (UL) data during the TXOP in the shared spectrum; and means for determining the interference tolerance level based on a receive power from one or more third wireless communication devices associated with the first network operating entity. The apparatus further includes means for detecting, from a third wireless communication device associated with a second network operating entity of the plurality of network operating entities, an RRS signal reserving another TXOP in the shared spectrum and indicating an interference tolerance level of the third wireless communication device; and means for yielding access to the shared spectrum during the another TXOP based on the interference tolerance level of the third wireless communication device. The apparatus further includes means for detecting, from a third wireless communication device associated with a second network operating entity of the plurality of network operating entities, an RRS signal reserving another TXOP in the shared spectrum and indicating an interference tolerance level of the third wireless communication device; and means for communicating, with a fourth wireless communication device, data during the another TXOP in the shared spectrum based on the interference tolerance level of the third wireless communication device. The apparatus further includes wherein the means for transmitting the RRS signal is further configured to transmit a sounding reference signal (SRS). The apparatus further includes wherein the SRS is associated with a serving cell of the apparatus and the second wireless communication device. The apparatus further includes wherein the means for communicating the RRQ signal is further configured to receive, from the second wireless communication device, the RRQ signal indicating at least one of SRS resource information or SRS sequence information, and wherein the means for transmitting the RRS signal is further configured to transmit the SRS based on the at least one of SRS resource information or SRS sequence information. The apparatus further includes wherein the means for communicating the RRQ signal is further configured to transmit, to the second wireless communication device, the RRQ signal indicating at least one of SRS resource information or SRS sequence information, and wherein the means for transmitting the RRS signal is further configured to transmit the SRS based on the at least one of SRS resource information or SRS sequence information. The apparatus further includes wherein the TXOP includes a first resource and a second resource, wherein the first resource is designated to the first network operating entity for an RRS signal transmission associated with a first link direction, wherein the second resource is designated to the first network operating entity for an RRS signal transmission associated with a second link direction, wherein the first link direction and the second link direction are different, wherein the RRQ signal reserves the TXOP for communication in the first link direction, and wherein the RRS signal is transmitted using the first resource. The apparatus further includes wherein the first resource and the second resource are in different periods within the TXOP. The apparatus further includes wherein the first resource and the second resource occupy different portions of the shared spectrum in a same period within the TXOP. The apparatus further includes means for receiving an RRS resource configuration based on signal measurements associated with the apparatus and the second wireless communication device, and wherein the RRS resource configuration indicates the first resource and the second resource.

Embodiments of the present disclosure further include an apparatus comprising means for determining a transmission configuration of a second wireless communication device associated with a second network operating entity, wherein the apparatus is associated with a first network operating entity; and means for monitoring for a reservation for a transmission opportunity (TXOP) in a shared spectrum from the second network operating entity based on the transmission configuration, wherein the shared spectrum is shared by the first network operating entity and the second network operating entity.

The apparatus further includes wherein the transmission configuration includes at least one of a timing advance (TA) value, a cyclic-prefix (CP) length, a symbol duration, or a subcarrier spacing. The apparatus further includes means for refraining from transmitting in the shared spectrum during the TXOP based on the monitoring. The apparatus further includes means for communicating with a third wireless communication device, a reservation request (RRQ) signal to reserve the TXOP in the shared spectrum, wherein the third wireless communication device is associated with the first network operating entity; and means for transmitting, in response to the RRQ signal, a reservation response (RRS) signal based on the monitoring.

Embodiments of the present disclosure further include an apparatus comprising means for communicating with a second wireless communication device, a reservation request (RRQ) signal to reserve a transmission opportunity (TXOP) in a shared spectrum, wherein the shared spectrum is shared by a plurality of network operating entities, and wherein the apparatus and the second wireless communication device are associated with a first network operating entity of the plurality of network operating entities; means for communicating a reservation response (RRS) signal in a frequency subband within shared spectrum; and means for communicating with the second wireless communication device, data during the TXOP in the frequency subband within the shared spectrum.

The apparatus further includes wherein the means for communicating the RRQ signal is further configured to transmit, to the second wireless communication device, the RRQ signal indicating a transmission schedule for the TXOP in the frequency subband within the shared spectrum. The apparatus further includes wherein the means for communicating the RRQ signal is further configured to receive, from the second wireless communication device, the RRQ signal indicating a transmission schedule for the TXOP in the frequency subband within the shared spectrum. The apparatus further includes wherein the means for communicating the RRS signal is further configured to transmit, to the second wireless communication device, the RRS signal in the frequency subband within the shared spectrum. The apparatus further includes wherein the means for communicating the RRS signal is further configured to receive, from the second wireless communication device, the RRS signal in the frequency subband within the shared spectrum. The apparatus further includes means for detecting another RRS signal for the TXOP from a second network operating entity of the plurality of network operating entities, wherein the another RRS signal indicates another frequency subband within the shared spectrum. The apparatus further includes wherein the means for communicating the RRS signal is further configured to communicate the RRS signal in the frequency subband based on the another RRS signal detected.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:
1. A method of wireless communication, comprising:
communicating, by a first wireless communication device with a second wireless communication device, a reservation request (RRQ) signal to reserve a transmission opportunity (TXOP) in a shared frequency band including a plurality of frequency subbands, wherein the RRQ signal indicates a transmission schedule for the TXOP in a first subset of the plurality of frequency subbands that excludes at least one frequency subband of the plurality of frequency subbands, wherein the shared frequency band is shared by a plurality of network operating entities, and wherein the first wireless communication device and the second wireless communication device are associated with a first network operating entity of the plurality of network operating entities;
communicating, by the first wireless communication device simultaneously during a clear channel assessment (CCA) period within the TXOP, an individual reservation response (RRS) signal in each frequency subband of the first subset of the plurality of frequency subbands indicated by the RRQ signal; and
communicating, by the first wireless communication device with the second wireless communication device, data during a transmission period within the TXOP in the first subset of the plurality of frequency subbands.
2. The method of claim 1, wherein the communicating the RRQ signal includes:
transmitting, by the first wireless communication device to the second wireless communication device, the RRQ signal indicating the transmission schedule for the TXOP in the first subset of the plurality of frequency subbands that excludes the at least one frequency subband of the plurality of frequency subbands.

3. The method of claim 1, wherein the communicating the RRQ signal includes:
receiving, by the first wireless communication device from the second wireless communication device, the RRQ signal indicating the transmission schedule for the TXOP in the first subset of the plurality of frequency subbands that excludes the at least one frequency subband of the plurality of frequency subbands.

4. The method of claim 1, wherein the communicating the individual RRS signal includes:
transmitting, by the first wireless communication device to the second wireless communication device simultaneously during the CCA period, the individual RRS signal in each frequency subband of the first subset of the plurality of frequency subbands.

5. The method of claim 1, wherein the communicating the individual RRS signal includes:
receiving, by the first wireless communication device from the second wireless communication device simultaneously during the CCA period, the individual RRS signal in each frequency subband of the first subset of the plurality of frequency subbands.

6. The method of claim 1, further comprising:
detecting, by the first wireless communication device, another RRS signal for another TXOP from a second network operating entity of the plurality of network operating entities, wherein the another RRS signal indicates a second subset of the plurality of frequency subbands that excludes a third frequency subband of the plurality of frequency subbands; and
communicating, by the first wireless communication device with a third wireless communication device, data in the third frequency subband during the another TXOP based on the detecting.

7. The method of claim 6, wherein the second network operating entity has priority over the first network operating entity in the another TXOP.

8. An apparatus comprising:
a transceiver configured to:
communicate with a first wireless communication device, a reservation request (RRQ) signal to reserve a transmission opportunity (TXOP) in a shared frequency band including a plurality of frequency subbands, wherein the RRQ signal indicates a transmission schedule for the TXOP in a first subset of the plurality of frequency subbands that excludes at least one frequency subband of the plurality of frequency subbands, wherein the shared frequency band is shared by a plurality of network operating entities, and wherein the apparatus and the first wireless communication device are associated with a first network operating entity of the plurality of network operating entities;
communicate, simultaneously during a clear channel assessment (CCA) period within the TXOP, an individual reservation response (RRS) signal in each frequency subband of the first subset of the plurality of frequency subbands indicated by the RRQ signal; and
communicate with the first wireless communication device, data during a transmission period within the TXOP in the first subset of the plurality of frequency subbands.

9. The apparatus of claim 8, wherein the transceiver is further configured to:

communicate the RRQ signal by transmitting, to the first wireless communication device, the RRQ signal indicating the transmission schedule for the TXOP in the first subset of the plurality of frequency subbands that excludes the at least one frequency subband of the plurality of frequency subbands.

10. The apparatus of claim 8, wherein the transceiver is further configured to:
communicate the RRQ signal by receiving, from the first wireless communication device, the RRQ signal indicating the transmission schedule for the TXOP in the first subset of the plurality of frequency subbands that excludes the at least one frequency subband of the plurality of frequency subbands.

11. The apparatus of claim 8, wherein the transceiver is further configured to:
communicate the individual RRS signal by transmitting, to the first wireless communication device simultaneously during the CCA period, the individual RRS signal in each frequency subband of the first subset of the plurality of frequency subbands.

12. The apparatus of claim 8, wherein the transceiver is further configured to:
communicate the individual RRS signal by receiving, from the first wireless communication device simultaneously during the CCA period, the individual RRS signal in each frequency subband of the first subset of the plurality of frequency subbands.

13. The apparatus of claim 8, further comprising a processor configured to:
detect another RRS signal for another TXOP from a second network operating entity of the plurality of network operating entities, wherein the another RRS signal indicates a second subset of the plurality of frequency subbands that excludes a third frequency subband of the plurality of frequency subbands,
wherein the transceiver is further configured to:
communicate, with a second wireless communication device, data in the third frequency subband during the another TXOP based on the another RRS signal detected.

14. The apparatus of claim 13, wherein the second network operating entity has priority over the first network operating entity in the another TXOP.

15. A non-transitory computer-readable medium of wireless communication, comprising:
code for causing a first wireless communication device to communicate, with a second wireless communication device, a reservation request (RRQ) signal to reserve a transmission opportunity (TXOP) in a shared frequency band including a plurality of frequency subbands, wherein the RRQ signal indicates a transmission schedule for the TXOP in a first subset of the plurality of frequency subbands that excludes at least one frequency subband of the plurality of frequency subbands, wherein the shared frequency band is shared by a plurality of network operating entities, and wherein the first wireless communication device and the second wireless communication device are associated with a first network operating entity of the plurality of network operating entities;
code for causing the first wireless communication device to communicate, simultaneously during a clear channel assessment (CCA) period within the TXOP, an individual reservation response (RRS) signal in each frequency subband of the first subset of the plurality of frequency subbands indicated by the RRQ signal; and code for causing the first wireless communication device to communicate, with the second wireless communication device, data during a transmission period within the TXOP in the first subset of the plurality of frequency subbands.

16. The non-transitory computer-readable medium of claim 15, wherein the code for causing the first wireless communication device to communicate the RRQ signal is further configured to transmit, to the second wireless communication device, the RRQ signal indicating the transmission schedule for the TXOP in the first subset of the plurality of frequency subbands that excludes the at least one frequency subband of the plurality of frequency subbands.

17. The non-transitory computer-readable medium of claim 15, wherein the code for causing the first wireless communication device to communicate the RRQ signal is further configured to receive, from the second wireless communication device, the RRQ signal indicating the transmission schedule for the TXOP in the first subset of the plurality of frequency subbands that excludes the at least one frequency subband of the plurality of frequency subbands.

18. The non-transitory computer-readable medium of claim 15, wherein the code for causing the first wireless communication device to communicate the individual RRS signal is further configured to transmit, to the second wireless communication device simultaneously during the CCA period, the individual RRS signal in each frequency subband of the first subset of the plurality of frequency subbands.

19. The non-transitory computer-readable medium of claim 15, wherein the code for causing the first wireless communication device to communicate the RRS signal is further configured to receive, from the second wireless communication device simultaneously during the CCA period, the individual RRS signal in each frequency subband of the first subset of the plurality of frequency subbands.

20. The non-transitory computer-readable medium of claim 15, further comprising:
 code for causing the first wireless communication device to detect another RRS signal for another TXOP from a second network operating entity of the plurality of network operating entities, wherein the another RRS signal indicates a second subset of the plurality of frequency subbands that excludes a third frequency subband of the plurality of frequency subbands; and
 code for causing the first wireless communication device to communicate, with a third wireless communication device, data in the third frequency subband during the another TXOP based on the detecting.

21. The non-transitory computer-readable medium of claim 20, wherein the second network operating entity has priority over the first network operating entity in the another TXOP.

* * * * *